US012764665B2

(12) United States Patent
Su et al.

(10) Patent No.: US 12,764,665 B2
(45) Date of Patent: Oct. 13, 2026

(54) COMMUNICATION METHOD AND RELATED APPARATUS

(71) Applicant: HUAWEI TECHNOLOGIES CO., LTD., Shenzhen (CN)

(72) Inventors: Hongjia Su, Shanghai (CN); Wenting Guo, Shenzhen (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 18/545,748

(22) Filed: Dec. 19, 2023

(65) Prior Publication Data

US 2024/0121717 A1 Apr. 11, 2024

Related U.S. Application Data

(63) Continuation of application No. PCT/CN2022/098536, filed on Jun. 14, 2022.

(30) Foreign Application Priority Data

Jun. 21, 2021 (CN) ........................ 202110688643.X

(51) Int. Cl.
*H04W 52/02* (2009.01)
*H04W 72/044* (2023.01)
*H04W 72/40* (2023.01)

(52) U.S. Cl.
CPC ..... *H04W 52/0235* (2013.01); *H04W 72/044* (2013.01); *H04W 72/40* (2023.01)

(58) Field of Classification Search
CPC ........... H04W 52/0235; H04W 72/044; H04W 72/40; H04W 52/0229; H04W 52/028;
(Continued)

(56) References Cited

U.S. PATENT DOCUMENTS

2020/0053647 A1* 2/2020 Chae .................... H04W 56/001
2020/0196242 A1* 6/2020 Höglund ............... H04W 72/23
(Continued)

FOREIGN PATENT DOCUMENTS

EP 4135418 A1 2/2023

*Primary Examiner* — Atique Ahmed
(74) *Attorney, Agent, or Firm* — Leydig, Voit & Mayer, Ltd.

(57) ABSTRACT

A communication method and related terminal apparatus are provided, which are applicable to the fields such as V2X, intelligent driving, assisted driving, connected vehicles, internet of vehicles, and the like. A first terminal apparatus determines, based on identifier information and resource configuration information, a resource for sending an energy-saving signal, so that a destination of the energy-saving signal, namely, a second terminal apparatus, may learn of a source of the energy-saving signal. The second terminal apparatus determines, based on the identifier information and the resource configuration information, a resource for receiving the energy-saving signal, so that the second terminal apparatus may receive the energy-saving signal on a specified resource. The second terminal apparatus wakes up or goes to sleep based on the energy-saving signal, to reduce power consumption.

20 Claims, 10 Drawing Sheets

(a)

(b)

(58) Field of Classification Search
CPC ............... H04W 52/0216; H04W 4/70; H04W 52/0209; H04W 72/0446; H04W 72/23; H04W 72/0453; Y02D 30/70; H04L 5/0082; H04L 5/0044
See application file for complete search history.

(56) References Cited

U.S. PATENT DOCUMENTS

| | | | | |
|---|---|---|---|---|
| 2020/0229092 | A1* | 7/2020 | Wu | H04W 76/28 |
| 2020/0245303 | A1* | 7/2020 | Hwang | H04W 52/0235 |
| 2022/0007403 | A1* | 1/2022 | Li | H04W 72/20 |
| 2022/0078880 | A1* | 3/2022 | Maleki | H04W 52/0235 |
| 2022/0191792 | A1* | 6/2022 | Park | H04W 72/20 |
| 2022/0248327 | A1* | 8/2022 | Yang | H04W 52/0219 |
| 2022/0272650 | A1* | 8/2022 | Ko | H04W 76/28 |
| 2022/0272737 | A1* | 8/2022 | Zhao | H04W 72/51 |
| 2023/0164873 | A1* | 5/2023 | Hahn | H04W 52/0216 370/328 |
| 2024/0049263 | A1* | 2/2024 | Zhao | H04W 72/02 |
| 2024/0292329 | A1* | 8/2024 | Hoang | H04W 52/0225 |
| 2025/0024377 | A1* | 1/2025 | Zhao | H04W 52/0235 |

* cited by examiner

COMMUNICATION METHOD AND RELATED APPARATUS

CROSS-REFERENCE TO RELATED APPLICATIONS

This application is a continuation of International Application No. PCT/CN2022/098536, filed on Jun. 14, 2022, which claims priority to Chinese Patent Application No. 202110688643.X, filed on Jun. 21, 2021. The disclosures of the aforementioned applications are hereby incorporated by reference in their entireties.

TECHNICAL FIELD

Embodiments of this application relate to the field of communication technologies, and in particular, to a communication method and a related apparatus.

BACKGROUND

A sidelink technology is a technology for direct communication between terminal apparatuses. For example, in a common application scenario of a sidelink in the internet of vehicles, vehicle to another device (vehicle to everything, V2X) communication is an important key technology for implementing environment awareness and information exchange in the internet of vehicles. The another device herein may be another vehicle, infrastructure, a mobile terminal apparatus, or the like. V2X communication may be considered as an application scenario of device to device (D2D) communication. For example, vehicles directly communicate with each other, and obtain driving status information and a road surface condition between the vehicles in real time through interaction, to better assist vehicle driving and even implement autonomous driving.

An application scenario of sidelink communication includes but is not limited to: communication between a mobile phone and a wearable device, communication between an augmented reality (AR)/virtual reality (VR) helmet and a smart screen, communication between sensors, and the like. However, limited by a battery capacity of the terminal apparatus, to improve user experience, how to reduce energy consumption of the terminal apparatus becomes an urgent problem to be resolved.

SUMMARY

This embodiment of this application provides a communication method. A first terminal apparatus determines, based on identifier information and resource configuration information, a resource for sending an energy-saving signal, so that a destination of the energy-saving signal, namely, a second terminal apparatus, may learn of a source of the energy-saving signal. The second terminal apparatus determines, based on the identifier information and the resource configuration information, a resource for receiving the energy-saving signal, so that the second terminal apparatus may receive the energy-saving signal on a specified resource. The second terminal apparatus wakes up or goes to sleep based on the energy-saving signal, to reduce power consumption.

According to a first aspect, an embodiment of this application provides a communication method. The communication method is applied to a first terminal apparatus, and includes:

obtaining identifier information, where the identifier information identifies at least one of the following: the first terminal apparatus, a second terminal apparatus, a service of the first terminal apparatus, data of the first terminal apparatus, a service of the second terminal apparatus, or data of the second terminal apparatus; obtaining resource configuration information, where the resource configuration information is used to determine a first resource set of an energy-saving signal, the first resource set includes at least one of the following: a frequency domain resource set, a time domain resource set, or a code domain resource set, and the energy-saving signal indicates the second terminal apparatus to wake up or indicates the second terminal apparatus to go to sleep; determining a first resource based on the identifier information and the first resource set, where the first resource belongs to the first resource set; and sending the energy-saving signal to the second terminal apparatus on the first resource.

The energy-saving signal includes a wake-up signal (WUS) and a go-to-sleep signal (GTS). It may also be understood that the energy-saving signal is both a wake-up signal and a go-to-sleep signal. The energy-saving signal may be carried in control information, and is a field whose size is 1 bit. A different value of the bit indicates that the energy-saving signal is a wake-up signal (for example, a value "1") or a go-to-sleep signal (for example, a value "0"), or a wake-up signal (for example, a value "0") or a go-to-sleep signal (for example, a value "1"). The energy-saving signal includes an energy-saving signal sequence, that is, the energy-saving signal may be represented by a sequence, and may be carried in a PSFCH, or carried in a PSSCH, or carried in a physical sidelink energy-saving channel (dedicated to a physical sidelink channel for sending an energy-saving signal), or sent in a form of a signal (in this case, a resource of the energy-saving signal does not belong to a resource of the physical sidelink channel). For example, the energy-saving sequence may be a ZC sequence, and an energy-saving signal sequence generated by using different cyclic shift values may indicate that the energy-saving signal sequence is used to wake up or go to sleep.

Further, the energy-saving signal indicates the second terminal apparatus to wake up and listen to the sidelink information. The energy-saving signal further indicates the second terminal apparatus to go to sleep. That the second terminal apparatus is in a sleep mode includes but is not limited to that the second terminal apparatus does not listen to sidelink information, to reduce power consumption of the second terminal apparatus. The energy-saving signal may be a WUS, or may be a GTS, or may be a variant of the WUS or the GTS, which is not limited herein.

The first terminal apparatus may obtain the identifier information from the first terminal apparatus. For example, the first terminal apparatus may obtain the identifier information from a service (APP) layer, and the identifier information identifies data or a service. The data includes the data of the first terminal apparatus, the data of the second terminal apparatus, or data exchanged between the first terminal apparatus and the second terminal apparatus. The service includes the service of the first terminal apparatus, the service of the second terminal apparatus, or a service exchanged between the first terminal apparatus and the second terminal apparatus.

The resource configuration information may be configured by a network apparatus. This includes being configured by using radio resource control (RRC) signaling or a system message block (system information block, SIB) message. In another implementation solution, the resource configuration information may alternatively be indicated by the network apparatus by using downlink control information (DCI). The resource configuration information may alternatively be pre-configured (Pre-configuration), for example, be configuration information pre-configured when the first terminal apparatus is delivered from a factory. The resource configuration information may alternatively be pre-defined, for example, defined in a communication standard protocol or a regional/national law/specification, and does not need to be obtained through configuration, indication, or calculation. This is not limited herein.

In this embodiment of this application, according to the foregoing method, the first terminal apparatus determines, based on the identifier information and the resource configuration information, the resource for sending the energy-saving signal, so that the destination of the energy-saving signal, namely, the second terminal apparatus, may learn of the source of the energy-saving signal, and the second terminal apparatus may receive the energy-saving signal on the specified resource. The second terminal apparatus wakes up or goes to sleep based on the energy-saving signal, to reduce power consumption.

In a possible design, the frequency domain resource set includes a first sidelink bandwidth part, and the first sidelink bandwidth part is used to send the energy-saving signal. For example, the first sidelink bandwidth part includes at least $X_{freq}$ RBs, or includes at least $$X_{RB}^{subCH}$$

subchannels, or includes at least $$X_{RB}^{interlace}$$

resource block interlaces, where $X_{freq}$ is a positive integer, $$X_{RB}^{subCH}$$

is a positive integer, and $$X_{RB}^{interlace}$$

is a positive integer; or the frequency domain resource set includes a second sidelink bandwidth part, and the second sidelink bandwidth part is used to send the energy-saving signal and sidelink information. Specifically, the energy-saving signal can be sent on any configured sidelink bandwidth part. To be specific, the first terminal apparatus can use any PSCCH frequency domain resource and/or PSSCH frequency domain resource to send the energy-saving signal. Alternatively, the frequency domain resource set includes a first sidelink resource pool, and the first sidelink resource pool is used to send the energy-saving signal. Specifically, the first sidelink resource pool is a resource pool dedicated to the energy-saving signal. Another resource pool is used to send sidelink information, other data, or signaling. Alternatively, the frequency domain resource set includes a second sidelink resource pool, and the second sidelink resource pool is used to send the energy-saving signal and sidelink information. Specifically, the energy-saving signal can be sent on any configured resource, for example, any one or more resource pools in resource pool 1 to resource pool N, where N is a positive integer.

The sidelink information includes but is not limited to data, control signaling, feedback information, or the like that is transmitted on a sidelink. For example, the sidelink information may be sidelink control information, for example, physical-layer control signaling (sidelink control information, SCI) carried on a physical sidelink control channel (PSCCH), or may be data information and/or control information carried on a physical sidelink shared channel (PSSCH), or may be information carried on a physical sidelink feedback channel (PSFCH), including hybrid automatic repeat request (HARQ) feedback information, channel state information (CSI) feedback information, SL assistance information and other indication information, or may be synchronization information, for example, a synchronization information block (S-SSB). The SL assistance information includes a sidelink resource recommended for use, a sidelink resource not recommended for use, a sidelink resource collision indication, a sidelink resource reservation collision indication, an indication indicating that a half-duplex collision has occurred or is to occur in the future, and the like.

Further, the energy-saving signal occupies $N_{freq}$ frequency domain units, and the frequency domain unit is a subchannel, a resource block, or a resource block interlace (RB interlace), where $N_{freq}$ is a positive integer greater than or equal to 1, and a value of $N_{freq}$ is pre-defined, or is configured by a network apparatus, or is pre-configured. Specifically, $N_{freq}$ may be configured by the network apparatus, and include being configured by using RRC signaling or a SIB message, and in another implementation solution, may alternatively be indicated by the network apparatus by using DCI signaling. $N_{freq}$ may alternatively be pre-configured (Pre-configuration). For example, $N_{freq}$ is pre-configured when the first terminal apparatus is delivered from a factory, and $N_{freq}$ may alternatively be pre-defined, for example, defined in a communication standard protocol or a regional/national law/specification, and does not need to be obtained through configuration, indication, or calculation. This is not limited herein.

In this embodiment of this application, the energy-saving signal may use a plurality of frequency domain resource sets, improving implementation flexibility of the solution.

In a possible design, the time domain resource set includes $$N_{time}^{1}$$

slots, where $$N_{time}^{1} \geq 1, N_{time}^{1}$$

is a positive integer, and a value of $$N_{time}^{1}$$

is pre-defined, or is configured by a network apparatus, or is pre-configured. Specifically, a value of $$N_{time}^{1}$$

may be configured by the network apparatus, and include being configured by using RRC signaling or a SIB message, and in another implementation solution, may alternatively be indicated by the network apparatus by using DCI signaling. The value of $$N_{time}^{1}$$

may alternatively be pre-configured (Pre-configuration). For example, the value of $$N_{time}^{1}$$

is pre-configured when the first terminal apparatus is delivered from a factory, and the value of $$N_{time}^{1}$$

may alternatively be pre-defined, for example, defined in a communication standard protocol or a regional/national law/specification, and does not need to be obtained through configuration, indication, or calculation. This is not limited herein.

In a possible design, each of the $$N_{time}^{1}$$

slots includes $$N_{time}^{2}$$

symbols, where $$N_{time}^{2} \geq 2, N_{time}^{2}$$

is a positive integer, and a value of $$N_{time}^{2}$$

is pre-defined, or is configured by the network apparatus, or is pre-configured. Specifically, a value of $$N_{time}^{2}$$

may be configured by the network apparatus, and include being configured by using RRC signaling or a SIB message, and in another implementation solution, may alternatively be indicated by the network apparatus by using DCI signaling. The value of $$N_{time}^{2}$$

may alternatively be pre-configured (Pre-configuration). For example, the value of $$N_{time}^{2}$$

is pre-configured when the first terminal apparatus is delivered from a factory, and the value of $$N_{time}^{2}$$

may alternatively be pre-defined, for example, defined in a communication standard protocol or a regional/national law/specification, and does not need to be obtained through configuration, indication, or calculation. This is not limited herein.

In a possible design, the time unit of the time domain resource set may be another time unit such as a mini-slot. The time domain resource set may include $X_{mini\text{-}slot}$ slots, where $X_{mini\text{-}slot}$ is a positive integer. A value of $X_{mini\text{-}slot}$ is pre-defined, or is configured by a network apparatus, or is pre-configured. Specifically, $X_{mini\text{-}slot}$ may be configured by the network apparatus, and include being configured by using RRC signaling or a SIB message, and in another implementation solution, may alternatively be indicated by the network apparatus by using DCI signaling. $X_{mini\text{-}slot}$ may alternatively be pre-configured (Pre-configuration). For example, $X_{mini\text{-}slot}$ is pre-configured when the first terminal apparatus is delivered from a factory, and $X_{mini\text{-}slot}$ may alternatively be pre-defined, for example, defined in a communication standard protocol or a regional/national law/specification, and does not need to be obtained through configuration, indication, or calculation. This is not limited herein.

In a possible design, the $$N_{time}^{2}$$

symbols include one or more first time units, and each first time unit includes at least one first symbol and at least one second symbol. The first symbol is used for automatic gain control (AGC) training of the second terminal apparatus, so that the second terminal apparatus adjusts receiving strength based on an AGC training result. The second symbol is used to send the energy-saving signal; and a last sub-time unit of the at least one first symbol is adjacent to a first sub-time unit of the at least one second symbol in time domain.

In a possible design, the second symbol is AGC information, and information transmitted on the second symbol is copy information of information transmitted on the first symbol. For example, in a same first time unit, a same energy-saving signal is transmitted on the first symbol and the second symbol.

In a possible design, the information transmitted on the second symbol may alternatively be redundant information, for example, a character string "10101010".

In a possible design, to consider a sidelink transmission problem, a gap symbol is set as a last symbol of a slot for transmitting the energy-saving signal. For example, the first time unit includes six pairs of first symbols and second symbols, and a last bit of the first time unit is a gap symbol. No data may be transmitted in the gap symbol.

In a possible design, some or all resources in the time domain resource set are time domain resources of a physical sidelink feedback channel PSFCH. In other words, some or all resources in the time domain resource set use time domain resources of the PSFCH. For example, each of the $$N_{time}^{1}$$

slots includes the time domain resource of the physical sidelink feedback channel PSFCH; and the time domain resource of the PSFCH is used to send the energy-saving signal. The time domain resource set for transmitting the energy-saving signal may alternatively be the time domain resource of the PSFCH, improving implementation flexibility of the solution.

In a possible design, the frequency domain resource set belongs to a frequency domain resource of the physical sidelink feedback channel PSFCH, and/or the code domain resource set belongs to a code domain resource of the PSFCH; a resource of a first feedback belongs to the frequency domain resource of the PSFCH and/or the code domain resource of the PSFCH; and the frequency domain resource set and/or the code domain resource set do/does not overlap a resource of the first feedback, and the first feedback includes one or more of the following: a hybrid automatic repeat request HARQ feedback, a channel state information CSI feedback, and sidelink assistance information or synchronization information, for example, a synchronization information block (S-SSB). The sidelink assistance information includes a sidelink resource recommended for use, a sidelink resource not recommended for use, a sidelink resource collision indication, a sidelink resource reservation collision indication, an indication indicating that a half-duplex collision has occurred or is to occur in the future, and the like. The frequency domain resource set and/or the code domain resource set for transmitting the energy-saving signal may further belong to a resource of the PSFCH, improving implementation flexibility of the solution.

In a possible design, system frame numbers of one periodicity or direct connection system frame numbers of one periodicity include at least two time domain resource sets, and the system frame numbers of one periodicity include 1024 system frame numbers, and the direct connection system frame numbers of one periodicity include 1024 direct connection system frame numbers; and in the at least two time domain resource sets, a time domain offset between a start position of a first time domain resource set and a system frame number whose system frame number is 0 is $$X_{offset}^{1}$$

time units, a time domain interval between every two adjacent time domain resource sets is $M_1$ time units, where $M_1$ is a positive integer greater than or equal to 1, and values of $$X_{offset}^{1}$$

and $M_1$ are pre-defined, or are configured by a network apparatus, or are pre-configured. Specifically, values of $$X_{offset}^{1}$$

and $M_1$ may be configured by the network apparatus, and include being configured by using RRC signaling or a SIB message, and in another implementation solution, may alternatively be indicated by the network apparatus by using DCI signaling. The values of $$X_{offset}^{1}$$

and $M_1$ may alternatively be pre-configured (Pre-configuration). For example, the values of $$X_{offset}^{1}$$

and $M_1$ are pre-configured when the first terminal apparatus is delivered from a factory, and the values of $$X_{offset}^{1}$$

and $M_1$ may alternatively be pre-defined, for example, defined in a communication standard protocol or a regional/national law/specification, and does not need to be obtained through configuration, indication, or calculation. This is not limited herein.

Alternatively, in the at least two time domain resource sets, a time domain offset between a start position of a first time domain resource set and a direct connection system frame number whose direct connection system frame number is 0 is $$X_{offset}^{2}$$

time units, a time domain interval between every two adjacent time domain resource sets is $M_2$ time units, where $M_2$ is a positive integer greater than or equal to 1, and values of $$X_{offset}^{2}$$

and $M_2$ are pre-defined, or are configured by a network apparatus, or are pre-configured. Specifically, values of $$X_{offset}^{2}$$

and $M_2$ may be configured by the network apparatus, and include being configured by using RRC signaling or a SIB message, and in another implementation solution, may alternatively be indicated by the network apparatus by using DCI signaling. The values of $X_{offset}^{2}$ and $M_2$ may alternatively be pre-configured (Pre-configuration). For example, the values of $X_{offset}^{2}$ and $M_2$ are pre-configured when the first terminal apparatus is delivered from a factory, and the values of $X_{offset}^{2}$ and $M_2$ may alternatively be pre-defined, for example, defined in a communication standard protocol or a regional/national law/specification, and does not need to be obtained through configuration, indication, or calculation. This is not limited herein.

The time unit is a frame or a slot or a symbol.

In a possible design, the communication method further includes: obtaining sidelink discontinuous reception configuration information of the second terminal apparatus, where the sidelink discontinuous reception configuration information indicates a sidelink discontinuous reception on time period, and the second terminal apparatus receives sidelink information from the first terminal apparatus in the sidelink discontinuous reception on time period. A time domain offset between a start position of the time domain resource set and a start position of the sidelink discontinuous reception on time period is $X_{offset}^{3}$ time units, and a value of $X_{offset}^{3}$ is pre-defined, or is configured by the network apparatus, or is pre-configured.

Specifically, the SL-DRX configuration information is configured by the first terminal apparatus to the second terminal apparatus, so that the first terminal apparatus obtains the SL-DRX configuration information from the first terminal apparatus. Alternatively, the SL-DRX configuration information is sent from the second terminal apparatus to the first terminal apparatus. Alternatively, the SL-DRX configuration information is configured by the network apparatus to the first terminal apparatus. Alternatively, the SL-DRX configuration information is pre-configured. A time domain offset between a start position of the time domain resource set and a start position of the DRX ON time period is $X_{offset}^{3}$ time units, and a value of $X_{offset}^{3}$ is pre-defined, or is configured by a network apparatus, or is pre-configured, where $X_{offset}^{3}$ is a positive integer. Specifically, $X_{offset}^{3}$ may be configured by the network apparatus, and include being configured by using RRC signaling or a SIB message, and in another implementation solution, may alternatively be indicated by the network apparatus by using DCI signaling.

$X_{offset}^{3}$ may alternatively be pre-configured (Pre-configuration). For example $X_{offset}^{3}$ is pre-configured when the first terminal apparatus is delivered from a factory, and $X_{offset}^{3}$ may alternatively be pre-defined, for example, defined in a communication standard protocol or a regional/national law/specification, and does not need to be obtained through configuration, indication, or calculation. This is not limited herein.

In a possible design, the energy-saving signal includes an energy-saving signal sequence, the code domain resource set includes $CS_m$ cyclic shift values, the $CS_m$ cyclic shift values are cyclic shift values for generating the energy-saving signal sequence, and each pair of cyclic shift values in the $CS_m$ cyclic shift values indicates the second terminal apparatus to listen to the sidelink information from the first terminal apparatus or indicates the second terminal apparatus to go to sleep, where $CS_m \geq 2i$, and i is a positive integer.

Specifically, the energy-saving signal includes the energy-saving signal sequence, that is, the energy-saving signal can be represented by a sequence. The energy-saving signal sequence may be a low signal peak-to-average power ratio (PAPR) sequence, such as a ZC (Zadoff-Chu) sequence.

The first terminal apparatus determines $CS_m$ cyclic shift values based on the resource configuration information. The code domain resource set includes $CS_m$ cyclic shift values, the cyclic shift values are used to generate the energy-saving signal sequence, and each pair of cyclic shift values in the $CS_m$ cyclic shift values indicates the second terminal apparatus to listen to the sidelink information or indicates the second terminal apparatus to go to sleep, where $CS_m \geq 2i$, and i is a positive integer. The sidelink information may be from the first terminal apparatus. For example, the sidelink information may be sidelink control information, for example, SCI information carried on a PSCCH, or may be data information and/or control information carried on a PSSCH, or may be information carried on a PSFCH, including hybrid automatic repeat request (HARQ) feedback information, channel state information (CSI) feedback information, SL assistance information and other indication information, or may be synchronization information, for example, a synchronization information block (S-SSB).

For example, if the frequency domain resource set includes 1 RB and the time domain resource set includes 1 symbol, cyclic shift values includes a total of 12 integers between 0 and 11: $CS_m=\{0, 1, 2, 3, 4, 5, 6, 7, 8, 9, 10, 11\}$.

In a possible design, the communication method further includes: determining a total quantity of resources in the first resource set, where the total quantity of resources includes one or more of the following: a total quantity of frequency domain resource sets, a total quantity of time domain resource sets, or a total quantity of code domain resource sets; and determining the first resource based on the total quantity of resources, a first sequence, and the identifier information, where the first sequence is an index sequence of the total quantity of resources. The identifier information includes one or more of the following: source identifier information, destination identifier information, or a group member identifier.

The first terminal apparatus determines the total quantity of resources in the first resource set, and the total quantity of resources includes one or more of the following: the total quantity of frequency domain resource sets, the total quantity of time domain resource sets, or the total quantity of code domain resource sets. That is, the total quantity of resources is a total quantity of resources (including frequency domain resources, time domain resources, and/or code domain resources) that can be used by one energy-saving signal in one periodicity. The total quantity of resources may be a product of the total quantity of frequency domain resource sets, the total quantity of time domain resource sets, and the total quantity of code domain resource sets.

The first terminal apparatus determines the first resource based on the total quantity of resources, the first sequence, and the identifier information. The first sequence is referred to as the index sequence of the total quantity of resources. For example, the first sequence can be as follows: the frequency domain resource, the time domain resource, and the code domain resource. The first sequence may alternatively be as follows: the time domain resource, the frequency domain resource, and the code domain resource. The first sequence may alternatively be as follows: the code domain resource, the frequency domain resource, and the time domain resource. This is not limited herein. The identifier information includes one or more of the following: source identifier information, destination identifier information, or a group member identifier. The source identifier information includes: an identifier of the first terminal apparatus, or an identifier of a terminal apparatus that initiates a service, or an identifier of a terminal apparatus that sends data; the destination identifier information includes: an identifier of the second terminal apparatus, or an identifier of a terminal apparatus that receives a service, or an identifier of a terminal apparatus that receives data; and the group member identifier is an identifier of a group member in a multicast. From a perspective of a physical layer, the data may be data transmitted on a PSSCH.

In a possible implementation, sorting may be performed in a specific sequence in one frequency domain resource (for example, an SL-BWP, a resource pool, a channel, or each subchannel), and then sorting is performed in a specific sequence in a next frequency domain resource (for example, an SL-BWP, a resource pool, a channel, or each subchannel), and the first sequence is determined by analogy.

According to a second aspect, an embodiment of this application provides a communication method. The communication method is applied to a second terminal apparatus, and includes:

- obtaining identifier information, where the identifier information identifies at least one of the following: a first terminal apparatus, the second terminal apparatus, a service of the first terminal apparatus, data of the first terminal apparatus, a service of the second terminal apparatus, or data of the second terminal apparatus; obtaining resource configuration information, where the resource configuration information is used to determine a first resource set of an energy-saving signal, the first resource set includes at least one of the following: a frequency domain resource set, a time domain resource set, or a code domain resource set, and the energy-saving signal indicates the second terminal apparatus to wake up or indicates the second terminal apparatus to go to sleep; determining a first resource based on the identifier information and the first resource set, where the first resource belongs to the first resource set; and receiving the energy-saving signal from the first terminal apparatus on the first resource.

The energy-saving signal includes a wake-up signal (WUS) and a go-to-sleep signal (GTS). It may also be understood that the energy-saving signal is both a wake-up signal and a go-to-sleep signal. The energy-saving signal may be carried in control information, and is a field whose size is 1 bit. A different value of the bit indicates that the energy-saving signal is a wake-up signal (for example, a value "1") or a go-to-sleep signal (for example, a value "0"). The energy-saving signal includes an energy-saving signal sequence, that is, the energy-saving signal may be represented by a sequence, and may be carried in a PSFCH, or carried in a PSSCH, or carried in a physical sidelink energy-saving channel (dedicated to a physical sidelink channel for sending an energy-saving signal), or sent in a form of a signal (in this case, a resource of the energy-saving signal does not belong to a resource of the physical sidelink channel). For example, the energy-saving sequence may be a ZC sequence, and an energy-saving signal sequence generated by using different cyclic shift values may indicate that the energy-saving signal sequence is used to wake up or go to sleep.

Further, the energy-saving signal indicates the second terminal apparatus to wake up and listen to the sidelink information. The energy-saving signal further indicates the second terminal apparatus to go to sleep. That the second terminal apparatus is in a sleep mode includes but is not limited to that the second terminal apparatus does not listen to sidelink information, to reduce power consumption of the second terminal apparatus. The energy-saving signal may be a WUS, or may be a GTS, or may be a variant of the WUS or the GTS, which is not limited herein. For example, the energy-saving signal may be carried in control information, and is a field whose size is 1 bit. A different value of the bit indicates that the energy-saving signal indicates the second terminal apparatus to wake up (for example, a value of the bit is "1") or indicates the second terminal apparatus to go to sleep (for example, a value of the bit is "0"). The energy-saving signal includes an energy-saving signal sequence, that is, the energy-saving signal may be represented by a sequence, and may be carried in a PSFCH, or carried in a PSSCH, or carried in a physical sidelink energy-saving channel (dedicated to a physical sidelink channel for sending an energy-saving signal), or sent in a form of a signal (in this case, a resource of the energy-saving signal does not belong to a resource of the physical sidelink channel). For example, the energy-saving sequence may be a ZC sequence, and an energy-saving signal sequence generated by using different cyclic shift values may indicate that the energy-saving signal sequence indicates the second terminal apparatus to wake up or indicates the second terminal apparatus to go to sleep.

The second terminal apparatus may obtain the identifier information from the second terminal apparatus. For example, the second terminal apparatus may obtain the identifier information from a service (APP) layer, and the identifier information identifies data or a service. The data includes the data of the first terminal apparatus, the data of the second terminal apparatus, or data exchanged between the first terminal apparatus and the second terminal apparatus. The service includes the service of the first terminal apparatus, the service of the second terminal apparatus, or a service exchanged between the first terminal apparatus and the second terminal apparatus.

The resource configuration information may be configured by a network apparatus. This includes being configured by using radio resource control (RRC) signaling or a system message block (system information block, SIB) message. In another implementation solution, the resource configuration information may alternatively be indicated by the network apparatus by using downlink control information (DCI). The resource configuration information may alternatively be pre-configured (Pre-configuration), for example, be configuration information pre-configured when the first terminal apparatus is delivered from a factory. The resource configuration information may alternatively be pre-defined, for example, defined in a communication standard protocol or a regional/national law/specification, and does not need to be obtained through configuration, indication, or calculation. This is not limited herein.

In this embodiment of this application, according to the foregoing method, the second terminal apparatus determines, based on the identifier information and the resource configuration information, the resource for receiving the energy-saving signal, so that the second terminal apparatus may learn of the source of the energy-saving signal, and the second terminal apparatus may receive the energy-saving signal on the specified resource. The second terminal apparatus wakes up or goes to sleep based on the energy-saving signal, to reduce power consumption.

In a possible design, the frequency domain resource set includes a first sidelink bandwidth part, and the first sidelink bandwidth part is used to receive the energy-saving signal. For example, the first sidelink bandwidth part includes at least $X_{freq}$ RBs, or includes at least $$X_{RB}^{subCH}$$

subchannels, or includes at least $$X_{RB}^{interlace}$$

resource block interlaces, where $X_{freq}$ is a positive integer, $$X_{RB}^{subCH}$$

is a positive integer, and $$X_{RB}^{interlace}$$

is a positive integer; or the frequency domain resource set includes a second sidelink bandwidth part, and the second sidelink bandwidth part is used to receive the energy-saving signal and sidelink information. Specifically, the energy-saving signal can be sent on any configured sidelink bandwidth part. To be specific, the second terminal apparatus can use any PSCCH frequency domain resource and/or PSSCH frequency domain resource to receive the energy-saving signal. Alternatively, the frequency domain resource set includes a first sidelink resource pool, and the first sidelink resource pool is used to receive the energy-saving signal. Specifically, the first sidelink resource pool is a resource pool dedicated to the energy-saving signal. Another resource pool is used to receive sidelink information, other data, or signaling. Alternatively, the frequency domain resource set includes a second sidelink resource pool, and the second sidelink resource pool is used to receive the energy-saving signal and sidelink information. Specifically, the energy-saving signal can be received on any configured resource, for example, any one or more resource pools in resource pool 1 to resource pool N, where N is a positive integer.

The sidelink information includes but is not limited to data, control signaling, feedback information, or the like that is transmitted on a sidelink. For example, the sidelink information may be sidelink control information, for example, physical-layer control signaling (sidelink control information, SCI) carried on a physical sidelink control channel (PSCCH), or may be data information and/or control information carried on a physical sidelink shared channel (PSSCH), or may be information carried on a physical sidelink feedback channel (PSFCH), including hybrid automatic repeat request (HARQ) feedback information, channel state information (CSI) feedback information, SL assistance information and other indication information, or may be synchronization information, for example, a synchronization information block (S-SSB). The SL assistance information includes a sidelink resource recommended for use, a sidelink resource not recommended for use, a sidelink resource collision indication, a sidelink resource reservation collision indication, an indication indicating that a half-duplex collision has occurred or is to occur in the future, and the like.

Further, the energy-saving signal occupies $N_{freq}$ frequency domain units, and the frequency domain unit is a subchannel, a resource block, or a resource block interlace (RB interlace), where $N_{freq}$ is a positive integer greater than or equal to 1, and a value of $N_{freq}$ is pre-defined, or is configured by a network apparatus, or is pre-configured. Specifically, $N_{freq}$ may be configured by the network apparatus, and include being configured by using RRC signaling or a SIB message, and in another implementation solution, may alternatively be indicated by the network apparatus by using DCI signaling. $N_{freq}$ may alternatively be pre-configured (Pre-configuration). For example, $N_{freq}$ is pre-configured when the second terminal apparatus is delivered from a factory, and $N_{freq}$ may alternatively be pre-defined, for example, defined in a communication standard protocol or a regional/national law/specification, and does not need to be obtained through configuration, indication, or calculation. This is not limited herein.

In this embodiment of this application, the energy-saving signal may use a plurality of frequency domain resource sets, improving implementation flexibility of the solution.

In a possible design, the time domain resource set includes $$N_{time}^{1}$$

slots, where $$N_{time}^{1} \geq 1, N_{time}^{1}$$

is a positive integer, and a value of $$N_{time}^{1}$$

is pre-defined, or is configured by a network apparatus, or is pre-configured. Specifically, a value of $$N_{time}^{1}$$

may be configured by the network apparatus, and include being configured by using RRC signaling or a SIB message, and in another implementation solution, may alternatively be indicated by the network apparatus by using DCI signaling. The value of $$N_{time}^{1}$$

may alternatively be pre-configured (Pre-configuration). For example, the value of $$N_{time}^{1}$$

is pre-configured when the second terminal apparatus is delivered from a factory, and the value of $$N_{time}^{1}$$

may alternatively be pre-defined, for example, defined in a communication standard protocol or a regional/national law/specification, and does not need to be obtained through configuration, indication, or calculation. This is not limited herein.

In a possible design, each of the $$N_{time}^{1}$$

slots includes $$N_{time}^{2}$$

symbols, where $$N_{time}^{2} \geq 2, N_{time}^{2}$$

is a positive integer, and a value of $$N_{time}^{2}$$

is pre-defined, or is configured by the network apparatus, or is pre-configured. Specifically, a value of $$N_{time}^{2}$$

may be configured by the network apparatus, and include being configured by using RRC signaling or a SIB message, and in another implementation solution, may alternatively be indicated by the network apparatus by using DCI signaling. The value of $$N_{time}^{2}$$

may alternatively be pre-configured (Pre-configuration). For example, the value of $$N_{time}^{2}$$

is pre-configured when the second terminal apparatus is delivered from a factory, and the value of $$N_{time}^{2}$$

may alternatively be pre-defined, for example, defined in a communication standard protocol or a regional/national law/specification, and does not need to be obtained through configuration, indication, or calculation. This is not limited herein.

In a possible design, the $$N_{time}^{2}$$

symbols include one or more first time units, and each first time unit includes at least one first symbol and at least one second symbol. The first symbol is used for automatic gain control (AGC) training of the second terminal apparatus, so that the second terminal apparatus adjusts receiving strength based on an AGC training result. The second symbol is used to receive the energy-saving signal; and a last sub-time unit of the at least one first symbol is adjacent to a first sub-time unit of the at least one second symbol in time domain.

In a possible design, the second symbol is AGC information, and information transmitted on the second symbol is copy information of information transmitted on the first symbol. For example, in a same first time unit, a same energy-saving signal is transmitted on the first symbol and the second symbol.

In a possible design, the information transmitted on the second symbol may alternatively be redundant information, for example, a character string "10101010".

In a possible design, to consider a sidelink transmission problem, a gap symbol is set as a last symbol of a slot for transmitting the energy-saving signal. For example, the first time unit includes six pairs of first symbols and second symbols, and a last bit of the first time unit is a gap symbol. No data may be transmitted in the gap symbol.

In a possible design, the time unit of the time domain resource set may be another time unit such as a mini-slot. The time domain resource set may include $X_{mini\text{-}slot}$ slots, where $X_{mini\text{-}slot}$ is a positive integer. A value of $X_{mini\text{-}slot}$ is pre-defined, or is configured by a network apparatus, or is pre-configured. Specifically, $X_{mini\text{-}slot}$ may be configured by the network apparatus, and include being configured by using RRC signaling or a SIB message, and in another implementation solution, may alternatively be indicated by the network apparatus by using DCI signaling. $X_{mini\text{-}slot}$ may alternatively be pre-configured (Pre-configuration). For example, $X_{mini\text{-}slot}$ is pre-configured when the second terminal apparatus is delivered from a factory, and $X_{mini\text{-}slot}$ may alternatively be pre-defined, for example, defined in a communication standard protocol or a regional/national law/specification, and does not need to be obtained through configuration, indication, or calculation. This is not limited herein.

In a possible design, some or all resources in the time domain resource set are time domain resources of a physical sidelink feedback channel PSFCH. In other words, some or all resources in the time domain resource set use time domain resources of the PSFCH. For example, each of the $$N_{time}^{1}$$

slots includes the time domain resource of the physical sidelink feedback channel PSFCH; and the time domain resource of the PSFCH is used to receive the energy-saving signal. The time domain resource set for transmitting the energy-saving signal may alternatively be the time domain resource of the PSFCH, improving implementation flexibility of the solution.

In a possible design, the frequency domain resource set belongs to a frequency domain resource of the physical sidelink feedback channel PSFCH, and/or the code domain resource set belongs to a code domain resource of the PSFCH; a resource of a first feedback belongs to the frequency domain resource of the PSFCH and/or the code domain resource of the PSFCH; and the frequency domain resource set and/or the code domain resource set do/does not overlap a resource of the first feedback, and the first feedback includes one or more of the following: a hybrid automatic repeat request HARQ feedback, a channel state information CSI feedback, and sidelink assistance information or synchronization information, for example, a synchronization information block (S-SSB). The sidelink assistance information includes a sidelink resource recommended for use, a sidelink resource not recommended for use, a sidelink resource collision indication, a sidelink resource reservation collision indication, an indication indicating that a half-duplex collision has occurred or is to occur in the future, and the like. The frequency domain resource set and/or the code domain resource set for transmitting the energy-saving signal may further belong to a resource of the PSFCH, improving implementation flexibility of the solution.

In a possible design, system frame numbers of one periodicity or direct connection system frame numbers of one periodicity include at least two time domain resource sets, and the system frame numbers of one periodicity include 1024 system frame numbers, and the direct connection system frame numbers of one periodicity include 1024 direct connection system frame numbers; and in the at least two time domain resource sets, a time domain offset between a start position of a first time domain resource set and a system frame number whose system frame number is 0 is $$X_{offset}^{1}$$

time units, a time domain interval between every two adjacent time domain resource sets is $M_1$ time units, where $M_1$ is a positive integer greater than or equal to 1, and values of $$X_{offset}^{1}$$

and $M_1$ are pre-defined, or are configured by a network apparatus, or are pre-configured. Specifically, values of $$X_{offset}^{1}$$

and $M_1$ may be configured by the network apparatus, and include being configured by using RRC signaling or a SIB message, and in another implementation solution, may alternatively be indicated by the network apparatus by using DCI signaling. The values of $$X_{offset}^{1}$$

and $M_1$ may alternatively be pre-configured (Pre-configuration). For example, the values of $$X_{offset}^{1}$$

and $M_1$ are pre-configured when the second terminal apparatus is delivered from a factory, and the values of $$X_{offset}^{1}$$

and $M_1$ may alternatively be pre-defined, for example, defined in a communication standard protocol or a regional/national law/specification, and does not need to be obtained through configuration, indication, or calculation. This is not limited herein.

Alternatively, in the at least two time domain resource sets, a time domain offset between a start position of a first time domain resource set and a direct connection system frame number whose direct connection system frame number is 0 is $$X_{offset}^2$$

time units, a time domain interval between every two adjacent time domain resource sets is $M_2$ time units, where $M_2$ is a positive integer greater than or equal to 1, and values of $$X_{offset}^2$$

and $M_2$ are pre-defined, or are configured by a network apparatus, or are pre-configured. Specifically, values of $$X_{offset}^2$$

and $M_2$ may be configured by the network apparatus, and include being configured by using RRC signaling or a SIB message, and in another implementation solution, may alternatively be indicated by the network apparatus by using DCI signaling. The values of $$X_{offset}^2$$

and $M_2$ may alternatively be pre-configured (Pre-configuration). For example, the values of $$X_{offset}^2$$

and $M_2$ are pre-configured when the second terminal apparatus is delivered from a factory, and the values of $$X_{offset}^2$$

and $M_2$ may alternatively be pre-defined, for example, defined in a communication standard protocol or a regional/national law/specification, and does not need to be obtained through configuration, indication, or calculation. This is not limited herein.

The time unit is a frame or a slot or a symbol.

In a possible design, the communication method further includes: obtaining sidelink discontinuous reception configuration information of the second terminal apparatus, where the sidelink discontinuous reception configuration information indicates a sidelink discontinuous reception on time period, and the second terminal apparatus receives sidelink information from the first terminal apparatus in the sidelink discontinuous reception on time period. A time domain offset between a start position of the time domain resource set and a start position of the sidelink discontinuous reception on time period is $$X_{offset}^3$$

time units, and a value of $$X_{offset}^3$$

is pre-defined, or is configured by the network apparatus, or is pre-configured.

Specifically, the second terminal apparatus determines the DRX ON time period based on the SL-DRX configuration information of the second terminal apparatus. The second terminal apparatus can obtain the SL-DRX configuration information of the second terminal apparatus in a plurality of manners that include but not limited to: The second terminal apparatus receives the SL-DRX configuration information of the second terminal apparatus from the first terminal apparatus; the second terminal apparatus obtains the SL-DRX configuration information of the second terminal apparatus from the second terminal apparatus; the second terminal apparatus receives the SL-DRX configuration information of the second terminal apparatus from a network apparatus; or the SL-DRX configuration information of the second terminal apparatus is pre-configured. Specifically, $$X_{offset}^3$$

may be configured by the network apparatus, and include being configured by using RRC signaling or a SIB message, and in another implementation solution, may alternatively be indicated by the network apparatus by using DCI signaling.

$$X_{offset}^3$$

may alternatively be pre-configured (Pre-configuration). For example, $$X_{offset}^3$$

is pre-configured when the second terminal apparatus is delivered from a factory, and $$X_{offset}^3$$

may alternatively be pre-defined, for example, defined in a communication standard protocol or a regional/national law/specification, and does not need to be obtained through configuration, indication, or calculation. This is not limited herein.

In a possible design, the energy-saving signal includes an energy-saving signal sequence, the code domain resource set includes $CS_m$ cyclic shift values, the $CS_m$ cyclic shift values are cyclic shift values for generating the energy-saving signal sequence, and each pair of cyclic shift values in the $CS_m$ cyclic shift values indicates the second terminal apparatus to listen to the sidelink information from the first terminal apparatus or indicates the second terminal apparatus to go to sleep, where $CS_m \geq 2i$, and i is a positive integer.

Specifically, the energy-saving signal includes the energy-saving signal sequence, that is, the energy-saving signal can be represented by a sequence. The energy-saving signal sequence may be a low signal peak-to-average power ratio (PAPR) sequence, such as a ZC (Zadoff-Chu) sequence.

The second terminal apparatus determines $CS_m$ cyclic shift values based on the resource configuration information. The code domain resource set includes $CS_m$ cyclic shift values, the cyclic shift values are used to generate the energy-saving signal sequence, and each pair of cyclic shift values in the $CS_m$ cyclic shift values indicates the second terminal apparatus to listen to the sidelink information or indicates the second terminal apparatus to go to sleep, where $CS_m \geq 2i$, and i is a positive integer. The sidelink information may be from the first terminal apparatus. For example, the sidelink information may be sidelink control information, for example, SCI information carried on a PSCCH, or may be data information and/or control information carried on a PSSCH, or may be information carried on a PSFCH, including hybrid automatic repeat request (HARQ) feedback information, channel state information (CSI) feedback information, SL assistance information and other indication information, or may be synchronization information, for example, a synchronization information block (S-SSB).

For example, if the frequency domain resource set includes 1 RB and the time domain resource set includes 1 symbol, cyclic shift values includes a total of 12 integers between 0 and 11: $CS_m=\{0, 1, 2, 3, 4, 5, 6, 7, 8, 9, 10, 11\}$.

In a possible design, the communication method further includes: determining a total quantity of resources in the first resource set, where the total quantity of resources includes one or more of the following: a total quantity of frequency domain resource sets, a total quantity of time domain resource sets, or a total quantity of code domain resource sets; and determining the first resource based on the total quantity of resources, a first sequence, and the identifier information, where the first sequence is an index sequence of the total quantity of resources. The identifier information includes one or more of the following: source identifier information, destination identifier information, or a group member identifier.

The second terminal apparatus determines the total quantity of resources in the first resource set, and the total quantity of resources includes one or more of the following: the total quantity of frequency domain resource sets, the total quantity of time domain resource sets, or the total quantity of code domain resource sets. That is, the total quantity of resources is a total quantity of resources (including frequency domain resources, time domain resources, and/or code domain resources) that can be used by one energy-saving signal in one periodicity. The total quantity of resources may be a product of the total quantity of frequency domain resource sets, the total quantity of time domain resource sets, and the total quantity of code domain resource sets.

The first terminal apparatus determines the first resource based on the total quantity of resources, the first sequence, and the identifier information. The first sequence is referred to as the index sequence of the total quantity of resources. For example, the first sequence can be as follows: the frequency domain resource, the time domain resource, and the code domain resource. The first sequence may alternatively be as follows: the time domain resource, the frequency domain resource, and the code domain resource. The first sequence may alternatively be as follows: the code domain resource, the frequency domain resource, and the time domain resource. This is not limited herein. The identifier information includes one or more of the following: source identifier information, destination identifier information, or a group member identifier. The source identifier information includes: an identifier of the first terminal apparatus, or an identifier of a terminal apparatus that initiates a service, or an identifier of a terminal apparatus that sends data; the destination identifier information includes: an identifier of the second terminal apparatus, or an identifier of a terminal apparatus that receives a service, or an identifier of a terminal apparatus that receives data; and the group member identifier is an identifier of a group member in a multicast. From a perspective of a physical layer, the data may be data transmitted on a PSSCH.

In a possible implementation, sorting may be performed in a specific sequence in one frequency domain resource (for example, an SL-BWP, a resource pool, a channel, or each subchannel), and then sorting is performed in a specific sequence in a next frequency domain resource (for example, an SL-BWP, a resource pool, a channel, or each subchannel), and the first sequence is determined by analogy.

A third aspect of this application provides a terminal apparatus. The terminal apparatus includes a transceiver module and a processing module, where

- the transceiver module is configured to obtain identifier information, where the identifier information identifies at least one of the following: a first terminal apparatus, a second terminal apparatus, a service of the first terminal apparatus, data of the first terminal apparatus, a service of the second terminal apparatus, or data of the second terminal apparatus;
- the transceiver module is further configured to obtain resource configuration information, where the resource configuration information is used to determine a first resource set of an energy-saving signal, the first resource set includes at least one of the following: a frequency domain resource set, a time domain resource set, or a code domain resource set, and the energy-saving signal indicates the second terminal apparatus to wake up or indicates the second terminal apparatus to go to sleep;
- the processing module is configured to determine a first resource based on the identifier information and the first resource set, where the first resource belongs to the first resource set; and
- the transceiver module is further configured to send the energy-saving signal to the second terminal apparatus on the first resource.

In a possible design, the frequency domain resource set includes a first sidelink bandwidth part, and the first sidelink bandwidth part is used to send the energy-saving signal;

- the frequency domain resource set includes a second sidelink bandwidth part, and the second sidelink bandwidth part is used to send the energy-saving signal and sidelink information;
- the frequency domain resource set includes a first sidelink resource pool, and the first sidelink resource pool is used to send the energy-saving signal; or the frequency domain resource set includes a second sidelink resource pool, and the second sidelink resource pool is used to send the energy-saving signal and sidelink information.

In a possible design, the time domain resource set includes $$N_{time}^{1}$$

slots, where $$N_{time}^{1} \geq 1, N_{time}^{1}$$

is a positive integer, and a value of $$N_{time}^{1}$$

is pre-defined, or is configured by a network apparatus, or is pre-configured.

In a possible design, each of the $$N_{time}^{1}$$

slots includes $$N_{time}^{2}$$

symbols, where $$N_{time}^{2} \geq 2, N_{time}^{2}$$

is a positive integer, and a value of $$N_{time}^{2}$$

is pre-defined, or is configured by the network apparatus, or is pre-configured.

In a possible design, the $$N_{time}^{2}$$

symbols include one or more first time units, and each first time unit includes at least one first symbol and at least one second symbol;

the first symbol is used by the second terminal apparatus to perform automatic gain control AGC training;

the second symbol is used to send the energy-saving signal; and a last symbol in the at least one first symbol is adjacent to a $1^{st}$ symbol in the at least one second symbol in time domain.

In a possible design, each of the $$N_{time}^{1}$$

slots includes a time domain resource of a physical sidelink feedback channel PSFCH; and the time domain resource of the PSFCH is used to send the energy-saving signal.

In a possible design, the frequency domain resource set belongs to a frequency domain resource of the physical sidelink feedback channel PSFCH, and/or the code domain resource set belongs to a code domain resource of the PSFCH;

a resource of a first feedback belongs to the frequency domain resource of the PSFCH and/or the code domain resource of the PSFCH; and the frequency domain resource set and/or the code domain resource set do/does not overlap the resource of the first feedback, and the first feedback includes one or more of the following: a hybrid automatic repeat request HARQ feedback, a channel state information CSI feedback, and sidelink assistance information.

In a possible design, the transceiver module is further configured to obtain sidelink discontinuous reception configuration information of the second terminal apparatus, where the sidelink discontinuous reception configuration information indicates a sidelink discontinuous reception on time period, and the second terminal apparatus receives sidelink information from the first terminal apparatus in the sidelink discontinuous reception on time period, where a time domain offset between a start position of the time domain resource set and a start position of the sidelink discontinuous reception on time period is $$X_{offset}^{3}$$

time units, and a value of $$X_{offset}^{3}$$

is pre-defined, or is configured by the network apparatus, or is pre-configured.

In a possible design, the energy-saving signal includes an energy-saving signal sequence, the code domain resource set includes $CS_m$ cyclic shift values, the $CS_m$ cyclic shift values are cyclic shift values for generating the energy-saving signal sequence, and each pair of cyclic shift values in the $CS_m$ cyclic shift values indicates the second terminal apparatus to listen to the sidelink information from the first terminal apparatus or indicates the second terminal apparatus to go to sleep, where $CS_m \geq 2i$, and i is a positive integer.

In a possible design, the processing module is further configured to determine a total quantity of resources in the first resource set, where the total quantity of resources includes one or more of the following: a total quantity of frequency domain resource sets, a total quantity of time domain resource sets, or a total quantity of code domain resource sets; and the processing module is further configured to determine the first resource based on the total quantity of resources, a first sequence, and the identifier information, where the first sequence is an index sequence of the total quantity of resources, where the identifier information includes one or more of the following: source identifier information, destination identifier information, or a group member identifier.

A fourth aspect of this application provides a terminal apparatus. The terminal apparatus includes a transceiver module and a processing module, where the transceiver module is configured to obtain identifier information, where the identifier information identifies at least one of the following: a first terminal apparatus, a second terminal apparatus, a service of the first terminal apparatus, data of the first terminal apparatus, a service of the second terminal apparatus, or data of the second terminal apparatus;

the transceiver module is further configured to obtain resource configuration information, where the resource configuration information is used to determine a first resource set of an energy-saving signal, the first resource set includes at least one of the following: a frequency domain resource set, a time domain resource set, or a code domain resource set, and the energy-saving signal indicates the second terminal apparatus to wake up or indicates the second terminal apparatus to go to sleep;

the processing module is configured to determine a first resource based on the identifier information and the first resource set, where the first resource belongs to the first resource set; and the processing module is further configured to receive the energy-saving signal from the first terminal apparatus on the first resource.

In a possible design, the frequency domain resource set includes a first sidelink bandwidth part, and the first sidelink bandwidth part is used to receive the energy-saving signal;

the frequency domain resource set includes a second sidelink bandwidth part, and the second sidelink bandwidth part is used to receive the energy-saving signal and sidelink information;

the frequency domain resource set includes a first sidelink resource pool, and the first sidelink resource pool is used to receive the energy-saving signal; or the frequency domain resource set includes a second sidelink resource pool, and the second sidelink resource pool is used to receive the energy-saving signal and sidelink information.

In a possible design, the time domain resource set includes $$N_{time}^{1}$$

slots, where $$N_{time}^{1} \geq 1, N_{time}^{1}$$

is a positive integer, and a value of $$N_{time}^{1}$$

is pre-defined, or is configured by a network apparatus, or is pre-configured.

In a possible design, each of the $$N_{time}^{1}$$

slots includes $$N_{time}^{2}$$

symbols, where $$N_{time}^{2} \geq 2, N_{time}^{2}$$

is a positive integer, and a value of $$N_{time}^{2}$$

is pre-defined, or is configured by the network apparatus, or is pre-configured.

In a possible design, the $$N_{time}^{2}$$

symbols include one or more first time units, and each first time unit includes at least one first symbol and at least one second symbol;

the first symbol indicates the second terminal apparatus to perform automatic gain control AGC training;

the second symbol is used to receive the energy-saving signal;

a last symbol in the at least one first symbol is adjacent to a $1^{st}$ symbol in the at least one second symbol in time domain; and information transmitted on the first symbol is copy information of information transmitted on the second symbol.

In a possible design, each of the $$N_{time}^{1}$$

slots includes a time domain resource of a physical sidelink feedback channel PSFCH; and the time domain resource of the PSFCH is used to send the energy-saving signal.

In a possible design, the frequency domain resource set belongs to a frequency domain resource of the physical sidelink feedback channel PSFCH, and/or the code domain resource set belongs to a code domain resource of the PSFCH;

a resource of a first feedback belongs to the frequency domain resource of the PSFCH and/or the code domain resource of the PSFCH; and the frequency domain resource set and/or the code domain resource set do/does not overlap the resource of the first feedback, and the first feedback includes one or more of the following: a hybrid automatic repeat request HARQ feedback, a channel state information CSI feedback, and sidelink assistance information.

In a possible design, the transceiver module is further configured to obtain sidelink discontinuous reception configuration information of the second terminal apparatus, where the sidelink discontinuous reception configuration information indicates a sidelink discontinuous reception on time period, and the second terminal apparatus receives sidelink information from the first terminal apparatus in the sidelink discontinuous reception on time period, where a time domain offset between a start position of the time domain resource set and a start position of the sidelink discontinuous reception on time period is $$X_{offset}^{3}$$

time units, and a value of $$X_{offset}^{3}$$

is pre-defined, or is configured by the network apparatus, or is pre-configured.

In a possible design, the energy-saving signal includes an energy-saving signal sequence, the code domain resource set includes $CS_m$ cyclic shift values, the $CS_m$ cyclic shift values are cyclic shift values for generating the energy-saving signal sequence, and each pair of cyclic shift values in the $CS_m$ cyclic shift values indicates the second terminal apparatus to listen to the sidelink information from the first terminal apparatus or indicates the second terminal apparatus to go to sleep, where $CS_m \geq 2i$, and i is a positive integer.

In a possible design, the processing module is further configured to determine a total quantity of resources in the first resource set, where the total quantity of resources includes one or more of the following: a total quantity of frequency domain resource sets, a total quantity of time domain resource sets, or a total quantity of code domain resource sets; and the processing module is further configured to determine the first resource based on the total quantity of resources, a first sequence, and the identifier information, where the first sequence is an index sequence of the total quantity of resources, where the identifier information includes one or more of the following: source identifier information, destination identifier information, or a group member identifier.

A fifth aspect of this application provides a terminal apparatus. The terminal apparatus includes a processor, configured to enable the terminal apparatus to implement the method described in any one of the first aspect or the possible implementations of the first aspect. The apparatus may further include a memory. The memory is coupled to the processor. When the processor executes instructions stored in the memory, the terminal apparatus may be enabled to implement the method according to any possible implementation of the first aspect. The device may further include a communication interface. The communication interface is used by the apparatus to communicate with another device. For example, the communication interface may be a transceiver, a circuit, a bus, a module, or another type of communication interface.

In this application, the instructions in the memory may be stored in advance, or may be stored after being downloaded from the internet when the terminal apparatus is used. A source of the instructions in the memory is not specifically limited in this application. The coupling in this application is indirect coupling or connection between apparatuses, units, or modules for information exchange between the apparatuses, the units, or the modules, and may be in electrical, mechanical, or other forms.

A sixth aspect of this application provides a terminal apparatus. The terminal apparatus includes a processor, configured to enable the terminal apparatus to implement the method described in any one of the second aspect or the possible implementations of the second aspect. The apparatus may further include a memory. The memory is coupled to the processor. When the processor executes instructions stored in the memory, the terminal apparatus may be enabled to implement the method according to any possible implementation of the second aspect. The device may further include a communication interface. The communication interface is used by the apparatus to communicate with another device. For example, the communication interface may be a transceiver, a circuit, a bus, a module, or another type of communication interface.

In this application, the instructions in the memory may be stored in advance, or may be stored after being downloaded from the internet when the terminal apparatus is used. A source of the instructions in the memory is not specifically limited in this application. The coupling in this application is indirect coupling or connection between apparatuses, units, or modules for information exchange between the apparatuses, the units, or the modules, and may be in electrical, mechanical, or other forms.

A seventh aspect of this application provides a computer-readable storage medium. The computer-readable storage medium is configured to store a computer program. When the computer program is run on a computer, the computer is enabled to perform the method in any one of the first aspect or the possible implementations of the first aspect.

According to an eighth aspect of this application, a computer program product that includes instructions is provided. When the computer program product runs on a computer, the computer is enabled to perform the method according to any one of the first aspect or the possible implementations of the first aspect.

A ninth aspect of this application provides a computer-readable storage medium. The computer-readable storage medium is configured to store a computer program. When the computer program is run on a computer, the computer is enabled to perform the method in any one of the second aspect or the possible implementations of the second aspect.

According to a tenth aspect, this application provides a computer program product that includes instructions. When the computer program product runs on a computer, the computer is enabled to perform the method according to any one of the second aspect or the possible implementations of the second aspect.

According to an eleventh aspect of this application, this application provides a chip. The chip includes a processor, the processor is configured to execute a computer program or instructions stored in a memory, and when the computer program or the instructions are executed in the at least one processor, the method described in any one of the first aspect or the possible implementations of the first aspect, or the method described in any one of the second aspect or the possible implementations of the second aspect is performed.

In a possible design, the chip further includes a memory. The memory is configured to store program instructions and data that are necessary for a computer device. The chip may alternatively include a chip and another discrete device.

According to a twelfth aspect of this application, this application provides a communication system. The communication system includes the terminal apparatus in the third aspect and/or the fourth aspect.

DESCRIPTION OF EMBODIMENTS

Figure 1:
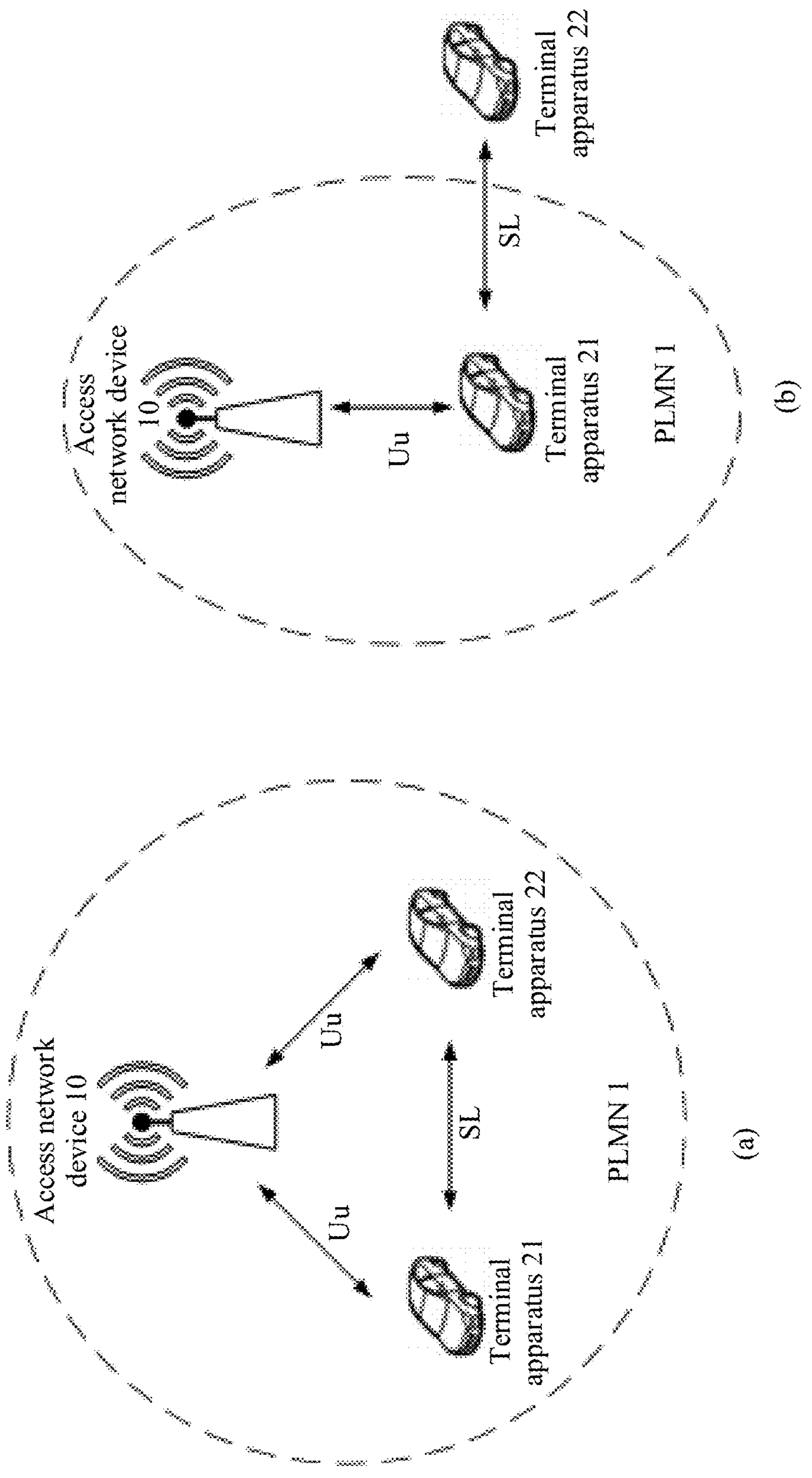
FIG. 1 is a schematic diagram of a structure of a communication system according to an embodiment of this application.

In this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, in embodiments of this application, words such as "first" and "second" are used for distinguishing between same items or similar items that have basically same functions or purposes. For example, a first threshold and a second threshold are merely intended to distinguish between different thresholds, but not to limit a sequential sequence thereof. A person skilled in the art may understand that the terms such as "first" and "second" do not limit a quantity or an execution sequence. "*" in a formula in embodiments of this application represents a multiplication sign.

It should be noted that, in this application, words "example" or "for example" are used to represent giving an example, an illustration, or a description. Any embodiment or design scheme described as an "example" or "for example" in this application should not be explained as being more preferred or having more advantages than another embodiment or design scheme. To be precise, the use of the term such as "example" or "for example" is intended to present a related concept in a specific manner.

Technical solutions provided in this application may be applied to a device to device (D2D) scenario, and optionally, may be applied to a vehicle to everything (V2X) scenario. For example, the V2X scenario may be specifically any one of the following systems: vehicle to vehicle (V2V) communication, vehicle to pedestrian ( ) communication, a vehicle to network (V2N) service, vehicle to infrastructure (V2I) communication, and the like.

For example, D2D may be long term evolution (LTE) D2D or new radio (NR) D2D, or may be D2D in another communication system that may appear as technologies develop. Similarly, V2X may be LTE V2X or NR V2X, or may be V2X in another communication system that may appear as technologies develop.

In addition, the service scenario and the communication system described in embodiments of this application are intended to describe the technical solutions in embodiments of this application more clearly, and do not constitute a limitation on the technical solutions provided in embodiments of this application. A person of ordinary skill in the art may know that, with evolution of a network architecture and emergence of a new service scenario, the technical solutions provided in embodiments of this application are also applicable to similar technical problems. Embodiments of this application are described by using an example in which a provided method is applied to a new radio (NR) system or a 5G network.

FIG. 1 is a schematic diagram of a structure of a communication system according to an embodiment of this application. Refer to FIG. 1. The communication system includes an access network device 10 and at least two terminal apparatuses. The access network device 10 may communicate with the at least two terminal apparatuses, and the at least two terminal apparatuses may communicate with each other. FIG. 1 is described by using an example in which the at least two terminal apparatuses include a terminal apparatus 21 and a terminal apparatus 22. The terminal apparatus 21 and the terminal apparatus 22 may be two terminal apparatuses in a same public land mobile network (PLMN), or may be two terminal apparatuses in different PLMNs. For example, in (a) in FIG. 1, the terminal apparatus 21 and the terminal apparatus 22 are both two terminal apparatuses in a PLMN 1; and in (b) in FIG. 1, the terminal apparatus 21 is a terminal apparatus in a PLMN 1, and the terminal apparatus 22 is not a terminal apparatus in the PLMN 1.

Optionally, the communication system shown in FIG. 1 may further include a core network. The access network device 10 may be connected to the core network. The core network may be a 4G core network (for example, an evolved packet core (EPC) network), a 5G core network (5G Core, 5GC), or a core network in various future communication systems.

For example, the core network may be the 4G core network. The access network device 10 may be an evolved NodeB (eNB, or eNodeB) in a 4G system. The terminal apparatus 21 may be a terminal apparatus that performs information transmission with an eNB. The eNB accesses the EPC network through an S1 interface.

For example, the core network may be the 5G core network. The access network device 10 may be a next-generation NodeB (gNB) in an NR system, and the terminal apparatus 21 may be a terminal apparatus that performs information transmission with a gNB. The gNB accesses the 5G core network through an NG interface.

Certainly, the access network device 10 may alternatively be a $3^{rd}$ generation partnership project (3GPP) protocol base station, or may be a non-3GPP protocol base station.

There is a first transmission link between the access network device 10 and the terminal apparatus 21 or the terminal apparatus 22. For example, the first transmission link may be a Uu link, and may be used to transmit a Uu service. There is a second transmission link between the terminal apparatus 21 and the terminal apparatus 22. For example, the second transmission link may be a sidelink (SL), and may be used to transmit a V2X service.

The terminal apparatus 21 and the terminal apparatus 22 may transmit a V2X service to each other on the sidelink, which may alternatively be referred to as sidelink information. The terminal apparatus 21 or the terminal apparatus 22 may transmit an uplink (UL) Uu service to the access network device 10 on the Uu link, or may receive, on the Uu link, a downlink (DL) Uu service sent by the access network device 10.

A direct connection communication interface between the terminal apparatus 21 and the terminal apparatus 22 may be an interface 1. For example, the interface 1 may be referred to as a PC5 interface, and use an internet of vehicles-dedicated frequency band (for example, 5.9 GHz). An interface between the terminal apparatus 21 and the access network device 10 may be referred to as an interface 2 (for example, a Uu interface), and use a cellular network frequency band (for example, 1.8 GHz). Names of the interface 1 and the interface 2 are merely examples. The names of the interface 1 and the interface 2 are not limited in this embodiment of this application.

The terminal apparatus 21 or the terminal apparatus 22 may be a device having a wireless communication function. The terminal apparatus 21 or the terminal apparatus 22 may be deployed on land, and includes an indoor device, an outdoor device, a handheld device, or a vehicle-mounted device. Alternatively, the terminal apparatus 21 or the terminal apparatus 22 may be deployed on water (for example, on a ship), or may be deployed in the air (for example, on an airplane, a balloon, or a satellite). The terminal apparatus is also referred to as user equipment (UE), a mobile station (MS), a mobile terminal (MT), and a terminal apparatus, and is a device that provides voice and/or data connectivity for a user. For example, the terminal apparatus includes a handheld device, a vehicle-mounted device, or the like that has a wireless connection function. Currently, the terminal apparatus may be a mobile phone, a tablet computer, a notebook computer, a palmtop computer, a mobile internet device (MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal apparatus in a smart grid, a wireless terminal apparatus in transportation safety, a wireless terminal apparatus in a smart city, a wireless terminal apparatus in a smart home, a flight device (for example, an intelligent robot, a hot balloon, an uncrewed aerial vehicle, or an aircraft), or the like. In a possible application scenario of this application, the terminal apparatus is a terminal apparatus that often works on the ground, for example, a vehicle-mounted device. For example, the terminal apparatus is an internet of vehicles system (telematics box, TBOX). In this application, for ease of description, a chip deployed in the foregoing device, for example, a system-on-a-chip (SOC), a baseband chip, or another chip having a communication function, may also be referred to as a terminal apparatus.

The terminal apparatus 21 or the terminal apparatus 22 may be a vehicle having a corresponding communication function, a vehicle-mounted communication apparatus, or another embedded communication apparatus, or may be a handheld communication device of a user, including a mobile phone, a tablet computer, or the like.

For example, in this embodiment of this application, the terminal apparatus 21 or the terminal apparatus 22 may further include a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of a user. The wearable device is not only a hardware device, but also implements a powerful function through software support, data exchange, and cloud interaction. Generic wearable smart devices include full-featured and large-size devices that can implement complete or partial functions without depending on smartphones, such as smart watches or smart glasses, and devices that focus only on a type of application function and need to work with other devices such as smartphones, such as various smart bands or smart jewelry for monitoring physical symptoms.

The access network device 10 is an entity that is used in cooperation with the terminal apparatus 21 or the terminal apparatus 22 and that may be configured to transmit or receive a signal. For example, the access network device may be an access point (AP) in a WLAN, or may be an evolved NodeB (eNB or eNodeB) in LTE, a relay station or an access point, a vehicle-mounted device, a wearable device, a network apparatus in a future 5G network, or an access network device in a future evolved PLMN network.

In addition, in embodiments of this application, the access network device provides a service for a cell, and the terminal apparatus communicates with the access network device by using a transmission resource (for example, a time domain resource, a frequency domain resource, or a time-frequency resource) used in the cell. The cell may be a cell corresponding to the access network device (for example, a base station). The cell may belong to a macro base station, or may belong to a base station corresponding to a small cell. The small cell herein may include a metro cell, a micro cell, a pico cell, a femto cell, or the like. These small cells are characterized by small coverage and low transmit power, and are applicable to providing a high-rate data transmission service.

In this embodiment of this application, the terminal apparatus may further include a relay. Alternatively, it may be understood that any device that can perform data communication with the network apparatus may be considered as a terminal apparatus.

If the various terminal apparatuses described above are located in a vehicle (for example, placed in the vehicle or installed in the vehicle), the terminal apparatuses may be considered as in-vehicle terminal apparatuses, and the in-vehicle terminal apparatus may be implemented as an on-board unit (OBU) or a communication apparatus used for an OBU; or if the various terminal apparatuses described above are located on a road side, for example, disposed on a road-side infrastructure, the terminal apparatus may be implemented as a road-side unit (RSU) or a communication apparatus used for an RSU, and the RSU is usually a road-side unit of a V2X system, the OBU can be used to receive real-time traffic information sent by traffic signal controllers, application servers, or network devices and dynamically notify related vehicles to avoid or reduce traffic accidents and improve traffic efficiency. The OBU is an on-board unit of a V2X system. It can communicate with the RSU/OBU through a PC5 interface to implement V2V, V2P, V2I, and V2N functions in the V2X system and support autonomous driving services.

In embodiments of this application, an apparatus configured to implement a function of the terminal apparatus may be a terminal apparatus, or may be an apparatus that can support a terminal apparatus in implementing the function, for example, a chip system. The apparatus may be installed in the terminal apparatus. In this embodiment of this application, the chip system may include a chip, or may include a chip and another discrete component. In the technical solutions provided in embodiments of this application, the technical solutions provided in embodiments of this application are described by using an example in which an apparatus configured to implement the function of the terminal apparatus is a terminal apparatus.

The following describes terms used in embodiments of this application.

A sidelink (SL) is defined for direct communication between terminal apparatuses, that is, a link for direct communication between terminal apparatuses without forwarding by a network apparatus.

The terminal apparatus may obtain SL resource pool configuration information and/or the SL bandwidth part (BWP) configuration information by receiving a system message block (system information block, SIB), cell-specific radio resource control (RRC) signaling, or terminal apparatus user-specific (UE-specific) RRC signaling of a network apparatus. Alternatively, the terminal apparatus may use pre-configured SL resource pool configuration information or SL BWP configuration information, for example, when there is no network coverage area. The SL resource pool configuration information includes resource pool resource information, and the resource pool resource information indicates the SL resource pool.

A physical layer of the sidelink mainly includes four types of channels: a physical sidelink control channel (PSCCH), a physical sidelink shared channel (PSSCH), a physical sidelink broadcast channel, and a physical sidelink feedback channel (PSFCH). In embodiments of this application, the physical sidelink control channel may be referred to as a PSCCH or a sidelink control channel, the physical sidelink shared channel may be referred to as a PSSCH or a sidelink data channel, and the physical sidelink feedback channel may be referred to as a PSFCH or a sidelink feedback channel.

A time-frequency resource for sidelink communication is configured based on a resource pool for sidelink communication. The resource pool may be a set of time resources and frequency resources for sidelink communication. The time resource may also be referred to as a time domain resource, and the frequency resource may also be referred to as a frequency domain resource.

Figure 2:
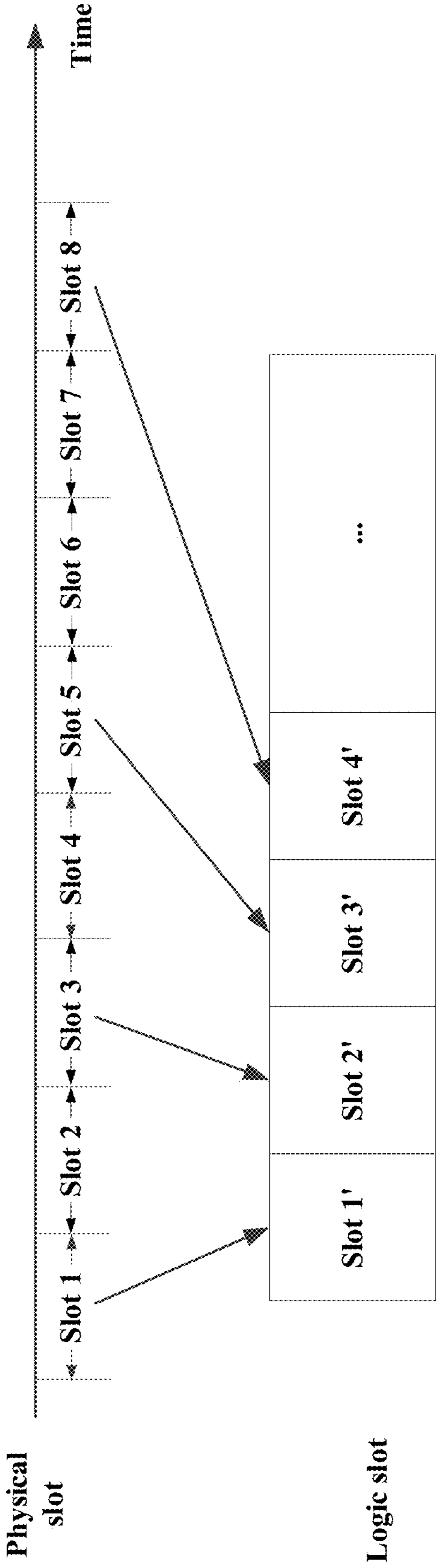
FIG. 2 is a schematic diagram of a slot according to an embodiment of this application.

A resource pool is used as an example. The resource pool is a set of time-frequency resources, and the resource pool is used for sidelink communication between terminal apparatuses. The resource pool may include a code domain resource. Resources in the resource pool are used to include a resource for sending and receiving at least one of the following physical channels by the terminal apparatus, such as a PSCCH, a PSSCH, a PSDCH, a PSFCH, and a PSBCH. A service type carried in the PSSCH may include a unicast, a multicast, and/or a broadcast communication type. The time domain resource may be represented by using a frame, a subframe, a slot, a symbol, or the like. One frame may include a plurality of subframes, one subframe may include a plurality of slots, and one slot may include a plurality of symbols. For example, one slot may include 14 symbols. The frequency domain resource may be represented by using a subchannel, a physical resource block (PRB), a subcarrier (SC), or the like. One subchannel may include a plurality of continuous PRBs in frequency domain, and one PRB may include a plurality of subcarriers. The PRB may also be referred to as a resource block (RB). For ease of understanding, FIG. 2 is a schematic diagram of a slot according to an embodiment of this application. As shown in FIG. 2, a slot 1 to a slot 8 are consecutive slots in time, and are referred to as physical slots. The physical slot 1, the physical slot 3, the physical slot 5, and the physical slot 8 are configured as slots that belong to one resource pool. Because the slots included in the resource pool may be discontinuous in time, from a perspective of the resource pool, the slot 1, the slot 3, the slot 5, and the slot 8 in the physical slots are corresponding to a slot 1', a slot 2', a slot 3', and a slot 4' in the resource pool. The consecutive slots (that is, the slot 1', the slot 2', the slot 3', and the slot 4') included in the resource pool are logically consecutive slots in the resource pool, and are referred to as logical slots.

A frequency domain resource in the SL resource pool includes one or more frequency domain units. The frequency domain unit may be one resource element (RE), several REs, one resource block (RB), several RBs, one subchannel, or several subchannels. A size of a subchannel indicates that one subchannel includes one or more consecutive resource blocks or interleaved resource blocks in frequency domain, for example, may be an integer such as 10, 12, 15, 20, 25, or 50. Interlaced resource blocks are one of manners of discrete RBs. Specifically, an interlaced resource (interlace) is defined or referred to as a resource block interlace. One channel, one BWP, one resource pool, or a subchannel in one resource pool may include M interlaced resources. Sequence numbers of RBs in an interlaced resource included in an $m^{th}$ interlaced resource ($m \in \{0, 1, \ldots, M-1\}$) are $\{m, M+m, 2M+m, 3M+m, \ldots\}$, m is an integer greater than or equal to 0, and M is an integer greater than or equal to 1. Generally, one interlaced resource includes at least 10 interlaced RBs. A quantity of interlaced RBs included in one interlaced resource may alternatively be less than 10. This is not limited herein. A value of M is related to a subcarrier spacing (SCS). For example, when a 15 kHz SCS is used, a value of M may be 10, and when a 30 kHz SCS is used, a value of M may be 5.

In a possible determining manner, when the terminal apparatus accesses a channel to perform sidelink communication, the channel belongs to an unlicensed frequency band. An SL resource pool includes an interlaced resource (interlace), and the resource pool includes the channel. In other words, a frequency domain resource of the resource pool is greater than or equal to a frequency domain resource of the channel. For example, one SL resource pool may include M subchannels, and one subchannel corresponds to one interlace. In other words, a quantity of subchannels is equal to a quantity of interlaces, and the subchannels are in a one-to-one correspondence with the interlaces. For example, a first subchannel corresponds to a first interlace, and so on. Alternatively, one SL resource pool includes M interlaces. Indexes (or sequence numbers or numbers) of interlaces in the resource pool are 0 to M−1. Optionally, one SL resource pool includes N subchannels, and it may be determined that at least one of the N subchannels includes the channel, that is, a frequency domain resource of the subchannel is greater than or equal to a frequency domain resource of the channel, each subchannel includes M interlaces, and indexes of the interlaces in each subchannel are 0 to M−1.

In addition, the PSCCH may occupy a plurality of continuous PRBs in one subchannel in frequency domain, the PSSCH may occupy one subchannel or a plurality of continuous subchannels in frequency domain, and the PSCCH and the PSSCH may occupy one or more SL time units in time domain. Each time unit may include a plurality of continuous symbols. The plurality of consecutive symbols may be configured by using radio resource control (RRC) signaling, and may be specifically determined by configuring a start symbol position and a quantity of symbols. For example, if the RRC signaling configures the start symbol position of the SL time unit to 0 and configures the quantity of symbols to 14, the time unit may be a slot. A symbol in this specification may be an orthogonal frequency division multiplexing (OFDM) symbol, that is, a symbol in this specification may be replaced with an OFDM symbol.

The SL resource pool configuration information may further include configuration information of the PSCCH, and the configuration information of the PSCCH includes a quantity of symbols occupied by the PSCCH in one slot and a quantity of RBs occupied by the PSCCH in one subchannel. The SL resource pool configuration information may further include configuration information of the PSFCH, and include period information of the PSFCH. To be specific, there is one PSFCH resource in every N slots, and a value of N is an integer greater than or equal to 0. When the value of N is 0, it indicates that no PSFCH resource exists in the resource pool.

The SL BWP configuration information may include SL resource pool information, and is used to configure a quantity of resource pools included in the BWP. The SL BWP configuration information may include SL bandwidth information, and indicates a bandwidth size for performing SL communication, for example, indicate that the SL bandwidth is 20 megahertz (MHz). The SL BWP configuration information may further include SL symbol information, which indicates a start SL symbol location in one slot and a quantity of occupied consecutive SL symbols. The SL BWP configuration information may further include an SL subcarrier spacing and cyclic prefix information, and indicates a subcarrier spacing and a cyclic prefix that are used for SL communication. The cyclic prefix indicates an extended cyclic prefix or a normal cyclic prefix. In a possible configuration, the SL BWP configuration information may further include SL resource pool configuration information. In this application, unless otherwise specified, a time unit is described by using a slot, but is not limited to that the time unit is only a slot. Unless otherwise specified, a frequency domain unit is described by using a subchannel, but is not limited to that the frequency domain unit is only a subchannel.

Discontinuous reception (DRX): After DRX is configured for the terminal apparatus, a DRX ON time period (DRX ON timer) in a DRX cycle and a timing period other than the DRX ON time period may be known. The timing period includes but is not limited to a random access timing period, a timing period for retransmission scheduling, a timing period for waiting for uplink scheduling after a scheduling request, and a timing period determined based on whether the terminal apparatus expects to receive control information. A union of all DRX ON time periods and timing periods is referred to as a DRX active time, and a time period remaining in the DRX cycle is referred to as a DRX inactive time.

Figure 3:
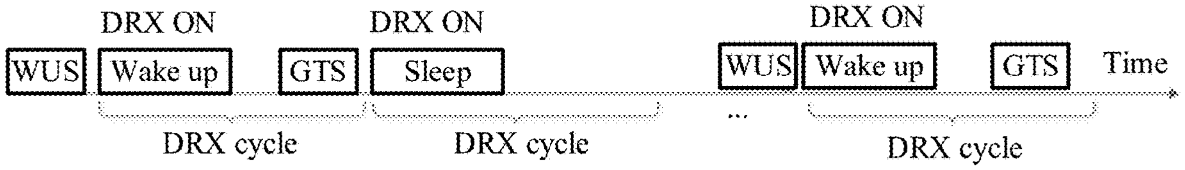
FIG. 3 is a schematic diagram of a WUS/GTS.

An energy-saving signal includes a wake-up signal (WUS) and a go-to-sleep signal (GTS). It may also be understood that the energy-saving signal is both a wake-up signal and a go-to-sleep signal. The energy-saving signal may be carried in control information, and is a field whose size is 1 bit. A different value of the bit indicates that the energy-saving signal is a wake-up signal (for example, a value "1") or a go-to-sleep signal (for example, a value "0"). The energy-saving signal includes an energy-saving signal sequence, that is, the energy-saving signal may be represented by a sequence, and may be carried in a PSFCH, or carried in a PSSCH, or carried in a physical sidelink energy-saving channel (dedicated to a physical sidelink channel for sending an energy-saving signal), or sent in a form of a signal (in this case, a resource of the energy-saving signal does not belong to a resource of the physical sidelink channel). For example, the energy-saving sequence may be a ZC sequence, and an energy-saving signal sequence generated by using different cyclic shift values may indicate that the energy-saving signal sequence is used to wake up or go to sleep. The terminal apparatus receives the control information normally in the DRX active time, and then receives data based on the control information. Because DRX is semi-statically configured, in a DRX ON cycle, the terminal apparatus may not need to receive data. In this case, the terminal apparatus still needs to detect control information, which causes a waste and affects power consumption. Therefore, a WUS/GTS is introduced. The WUS/GTS is carried in downlink control information sent by the access network device to the terminal apparatus. For ease of understanding, FIG. 3 is a schematic diagram of a WUS/GTS. The access network device sends a WUS/GTS signal to the terminal apparatus, and notifies, by using the WUS/GTS signal, the terminal apparatus whether the terminal apparatus needs to keep awake in the DRX ON time of the terminal apparatus and detect the control information. The WUS signal indicates the terminal apparatus to keep awake and detect the control information in the DRX ON time, and the GTS signal indicates the terminal apparatus to go to sleep in the DRX ON time and not to detect the control information. In this way, unnecessary detection time is reduced, a sleep time is increased, and power consumption is reduced.

In a non-sidelink scenario, only an access network device in a same cell sends a wake-up signal and a go-to-sleep signal. However, in a sidelink scenario, different terminal apparatuses may communicate with each other, that is, each terminal apparatus may send data, as a transmit end, to another terminal apparatus (as a receive end). Therefore, the terminal apparatus cannot distinguish a source and a destination of a wake-up signal and a go-to-sleep signal. Therefore, to obtain the WUS/GTS signal, the terminal apparatus can only perform blind detection on all possible resources to determine whether the terminal apparatus is to be woken up or be indicated to go to sleep. This causes an increase of energy consumption. Further, if the energy-saving signal is carried in the control information, although the terminal apparatus may obtain identifier information to determine the source and the destination of the wake-up signal and the go-to-sleep signal, the control information needs to be decoded, which increases energy consumption of decoding. If the energy-saving signal is based on sequence detection or envelope detection, although energy consumption overheads of decoding can be greatly reduced, the source and the destination of the wake-up signal and the go-to-sleep signal cannot be determined, and consequently, the terminal apparatus is woken up by an irrelevant terminal apparatus or is indicated to go to sleep, resulting in an energy consumption increase or incorrectly going to sleep, and data cannot be correctly received. Based on this, an embodiment of this application proposes a communication method: A first terminal apparatus obtains identifier information, where the identifier information identifies at least one of the following: the first terminal apparatus, a second terminal apparatus, a service of the first terminal apparatus, or data of the first terminal apparatus; the first terminal apparatus obtains resource configuration information, where the resource configuration information is used to determine a first resource set of an energy-saving signal, the first resource set includes at least one of the following: a frequency domain resource set, a time domain resource set, or a code domain resource set, and the energy-saving signal indicates the second terminal apparatus to wake up or indicates the second terminal apparatus to go to sleep; the first terminal apparatus determines a first resource based on the identifier information and the first resource set, where the first resource belongs to the first resource set; and the first terminal apparatus sends the energy-saving signal to the second terminal apparatus on the first resource. The energy-saving signal includes but is not limited to: a WUS, a GTS, a variation of the WUS, a variation of the GTS, or the like. According to the foregoing method, the first terminal apparatus determines, based on the identifier information and the resource configuration information, a resource for sending the energy-saving signal, so that a destination of the energy-saving signal, namely, the second terminal apparatus, may learn of a source of the energy-saving signal, and the second terminal apparatus may receive the energy-saving signal on the specified resource. The second terminal apparatus wakes up or goes to sleep based on the energy-saving signal, to reduce power consumption.

Figure 4:
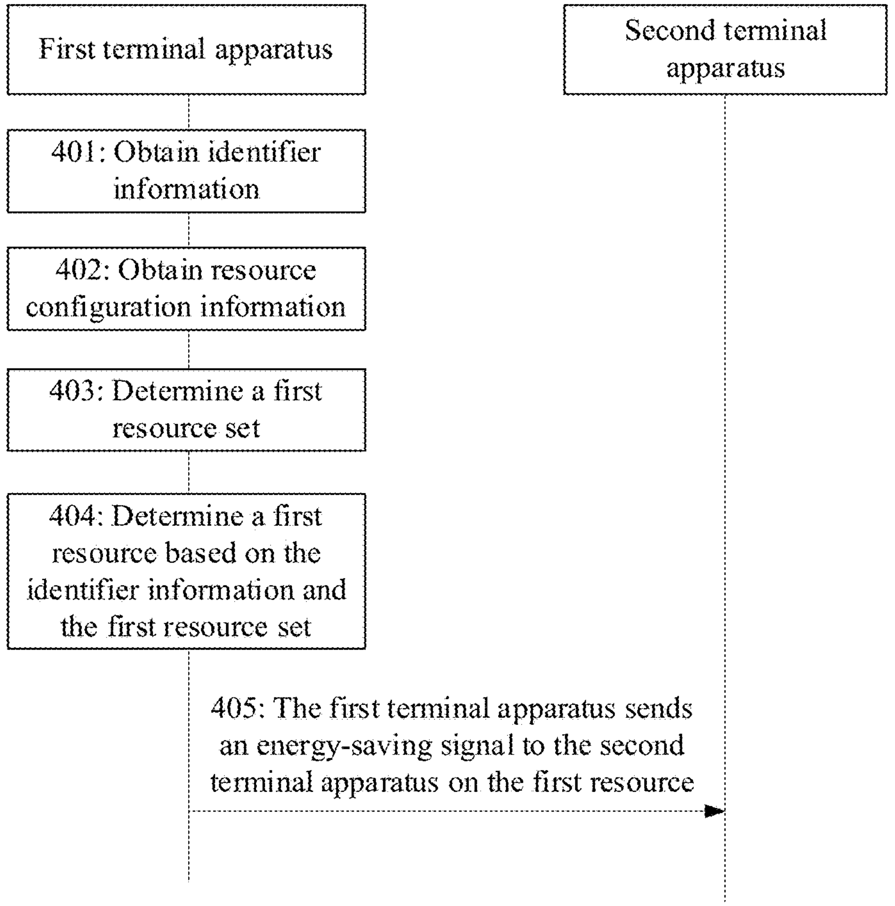
FIG. 4 is a schematic flowchart of a communication method according to an embodiment of this application.

The following describes embodiments of this application with reference to the accompanying drawings. FIG. 4 is a schematic flowchart of a communication method according to an embodiment of this application. The communication method provided in this embodiment of this application includes the following steps.

401: Obtain identifier information.

Step 401: A first terminal apparatus obtains identifier information, where the identifier information identifies at least one of the following: the first terminal apparatus, a second terminal apparatus, a service of the first terminal apparatus, or data of the first terminal apparatus.

Specifically, the identifier information includes one or more of the following: source identifier (source ID) information, or destination identifier (destination ID) information, or group member identifier. The group member identifier is a unique identifier of a member in multicast communication, a service layer (APP Layer) provides the group member identifier and a group size (that is, a quantity of members) information. The source identifier information includes: an identifier of the first terminal apparatus, or an identifier of a terminal apparatus that initiates a service, or an identifier of a terminal apparatus that sends data; the destination identifier information includes: an identifier of the second terminal apparatus, or an identifier of a terminal apparatus that receives a service, or an identifier of a terminal apparatus that receives data; and the group member identifier is an identifier of a group member in a multicast.

For example, a terminal apparatus that initiates a service is a terminal apparatus A, and a terminal apparatus that receives a service is a terminal apparatus B. Then, the source identifier information is identifier information of the terminal apparatus A, and the destination identifier information is identifier information of the terminal apparatus B.

For example, a terminal apparatus that sends data is a terminal apparatus A, and a terminal apparatus that receives data is a terminal apparatus B. Then, the source identifier information is identifier information of the terminal apparatus A, and the destination identifier information is identifier information of the terminal apparatus B.

Further, the identifier information may be layer-1 ID information, that is, physical-layer ID information. The layer-1 ID information is carried in physical-layer control signaling (sidelink control information, SCI). The identifier information may alternatively be layer-2 ID information, that is, media access control (MAC) layer ID information, and the layer-2 ID information is carried in a media access control control element (MAC CE).

The layer-2 ID information includes the layer-1 ID information, that is, the layer-1 ID information is a part of the layer-2 ID information. The layer-1 ID information is at least a part of the layer-2 ID information, that is, the layer-2 ID information includes a complete destination ID and a complete source ID, and the layer-1 ID information carries a part of the layer-2 ID information. For example, the layer-2 destination ID includes 24 bits, the layer-1 destination ID is first 16 bits of the layer-2 destination ID, the layer-2 source ID includes 24 bits, and the layer-1 source ID is first 8 bits information of the layer-2 source ID. The foregoing 8, 16, and 24 indicate an example, and may be another positive integer, provided that a quantity of bits of a layer-2 ID (including a source ID and a destination ID) is greater than or equal to a quantity of bits of a layer-1 ID.

The first terminal apparatus may obtain the identifier information from the first terminal apparatus. For example, the first terminal apparatus may obtain the identifier information from a service (APP) layer, and the identifier information identifies data or a service. The data includes the data of the first terminal apparatus, the data of the second terminal apparatus, or data exchanged between the first terminal apparatus and the second terminal apparatus. The service includes the service of the first terminal apparatus, the service of the second terminal apparatus, or a service exchanged between the first terminal apparatus and the second terminal apparatus.

402: Obtain resource configuration information.

In step 402, the first terminal apparatus obtains the resource configuration information. The resource configuration information is used to determine a first resource set of an energy-saving signal. Further, the resource configuration information determines a first resource set used for transmitting an energy-saving signal. The first resource set includes at least one of the following: a frequency domain resource set, a time domain resource set, or a code domain resource set, and the energy-saving signal indicates the second terminal apparatus to wake up or indicates the second terminal apparatus to go to sleep. Further, the energy-saving signal indicates the second terminal apparatus to wake up and listen to the sidelink information. The energy-saving signal further indicates the second terminal apparatus to go to sleep. That the second terminal apparatus is in a sleep mode includes but is not limited to that the second terminal apparatus does not listen to sidelink information, to reduce power consumption of the second terminal apparatus. The energy-saving signal may be a WUS, or may be a GTS, or may be a variant of the WUS or the GTS, which is not limited herein. For example, the energy-saving signal may be carried in control information, and is a field whose size is 1 bit. A different value of the bit indicates that the energy-saving signal indicates the second terminal apparatus to wake up (for example, a value of the bit is "1") or indicates the second terminal apparatus to go to sleep (for example, a value of the bit is "0"). The energy-saving signal includes an energy-saving signal sequence, that is, the energy-saving signal may be represented by a sequence, and may be carried in a PSFCH, or carried in a PSSCH, or carried in a physical sidelink energy-saving channel (dedicated to a physical sidelink channel for sending an energy-saving signal), or sent in a form of a signal (in this case, a resource of the energy-saving signal does not belong to a resource of the physical sidelink channel). For example, the energy-saving sequence may be a ZC sequence, and an energy-saving signal sequence generated by using different cyclic shift values may indicate that the energy-saving signal sequence indicates the second terminal apparatus to wake up or indicates the second terminal apparatus to go to sleep.

The resource configuration information may be configured by a network apparatus. This includes being configured by using RRC signaling or a SIB message. In another implementation solution, the resource configuration information may alternatively be indicated by the network apparatus by using downlink control information (DCI). The resource configuration information may alternatively be pre-configured (Pre-configuration), for example, be configuration information pre-configured when the first terminal apparatus is delivered from a factory. The resource configuration information may alternatively be pre-defined, for example, defined in a communication standard protocol or a regional/national law/specification, and does not need to be obtained through configuration, indication, or calculation. This is not limited herein.

403: Determine a first resource set.

In step 403, the first terminal apparatus determines the first resource set based on the resource configuration information. The following describes the first resource set in detail. First, a frequency domain resource set is described.

(1) Frequency Domain Resource Set

Figure 5:
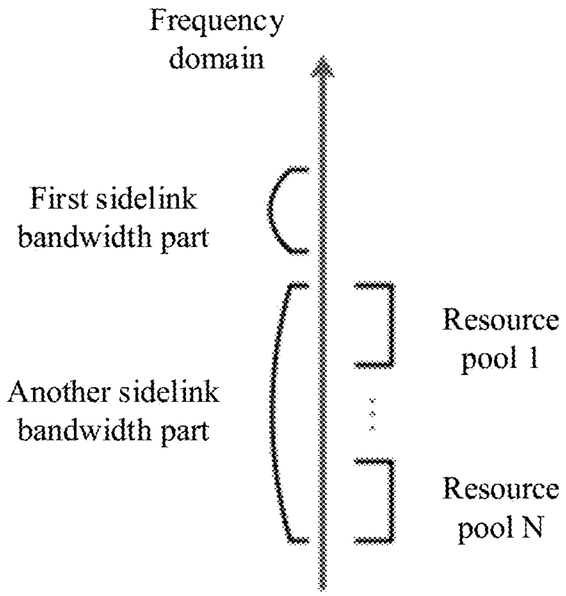
FIG. 5 is a schematic diagram of frequency domain resource sets according to an embodiment of this application.

The frequency domain resource set includes a first sidelink bandwidth part (SL-BWP), and the first sidelink bandwidth part is used to send the energy-saving signal. For example, the first sidelink bandwidth part includes at least $X_{freq}$ RBs, or includes at least $$X_{RB}^{subCH}$$

subchannels, or includes at least $$X_{RB}^{interlace}$$

resource block interlaces, where $X_{freq}$ is a positive integer, $$X_{RB}^{subCH}$$

is a positive integer, and $$X_{RB}^{interlace}$$

is a positive integer. For ease of understanding, FIG. 5 is a schematic diagram of frequency domain resource sets according to an embodiment of this application. The first sidelink bandwidth part is dedicated to transmitting energy-saving signals. Another sidelink bandwidth part is used to transmit sidelink information, other data, or signaling. The sidelink information includes but is not limited to data, control signaling, feedback information, or the like that is transmitted on a sidelink. For example, the sidelink information may be sidelink control information, for example, SCI information carried on a PSCCH, or may be data information and/or control information carried on a PSSCH, or may be information carried on a PSFCH, including hybrid automatic repeat request (HARQ) feedback information, channel state information (CSI) feedback information, SL assistance information and other indication information, or may be synchronization information, for example, a synchronization information block (S-SSB). The SL assistance information includes a sidelink resource recommended for use, a sidelink resource not recommended for use, a sidelink resource collision indication, a sidelink resource reservation collision indication, an indication indicating that a half-duplex collision has occurred or is to occur in the future, and the like.

Figure 6:
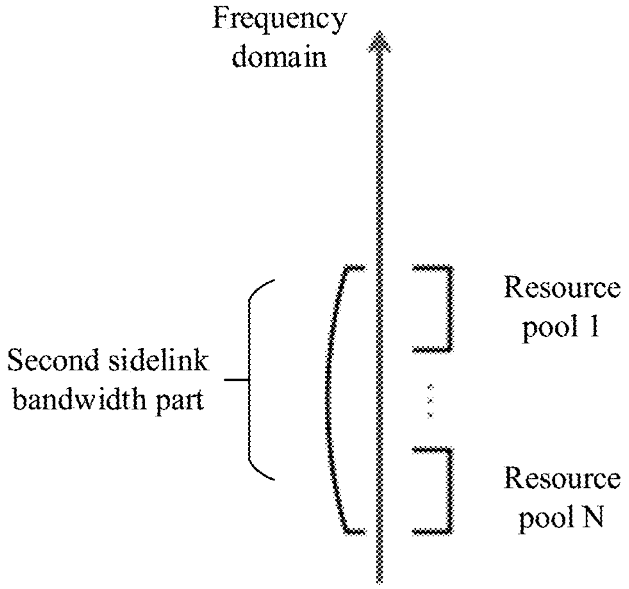
FIG. 6 is a schematic diagram of frequency domain resource sets according to an embodiment of this application.

Alternatively, the frequency domain resource set includes a second sidelink bandwidth part, and the second sidelink bandwidth part is used to send the energy-saving signal and sidelink information. For ease of understanding, FIG. 6 is a schematic diagram of frequency domain resource sets according to an embodiment of this application. Specifically, the energy-saving signal can be sent on any configured sidelink bandwidth part. To be specific, the first terminal apparatus can use any PSCCH frequency domain resource and/or PSSCH frequency domain resource to send the energy-saving signal.

Figure 7:
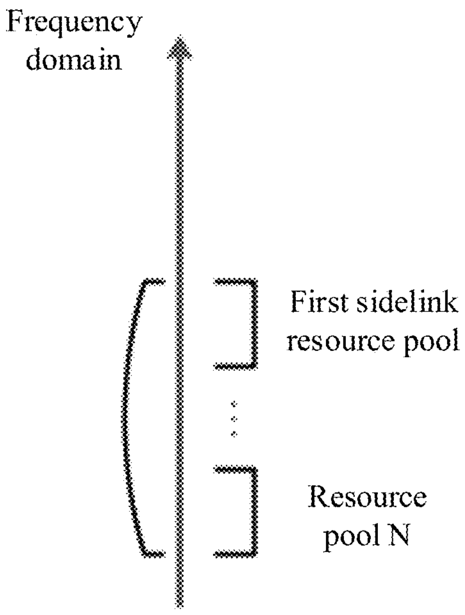
FIG. 7 is a schematic diagram of frequency domain resource sets according to an embodiment of this application.

Alternatively, the frequency domain resource set includes a first sidelink resource pool, and the first sidelink resource pool is used to send the energy-saving signal. For ease of understanding, FIG. 7 is a schematic diagram of frequency domain resource sets according to an embodiment of this application. The first sidelink resource pool is a resource pool dedicated to an energy-saving signal. Another resource pool (for example, a resource pool N) is used to send sidelink information, other data, or signaling.

Figure 8:
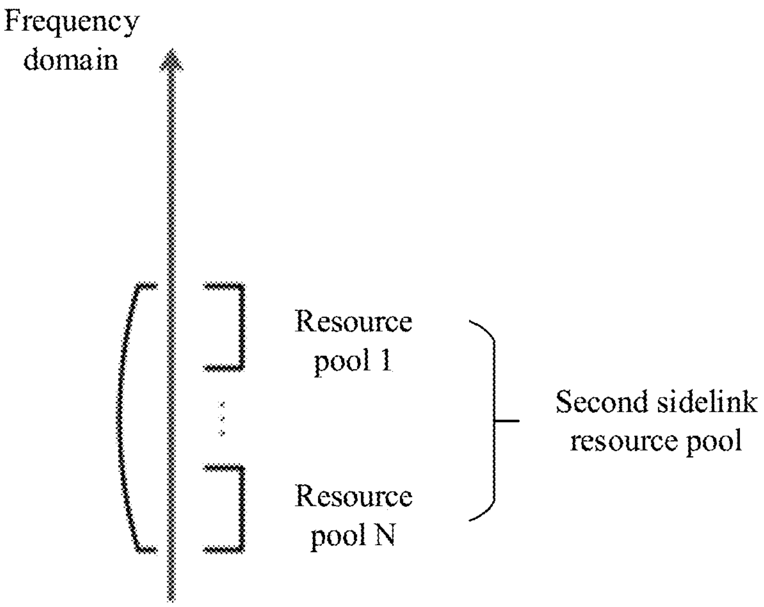
FIG. 8 is a schematic diagram of frequency domain resource sets according to an embodiment of this application.

Alternatively, the frequency domain resource set includes a second sidelink resource pool, and the second sidelink resource pool is used to send the energy-saving signal and sidelink information. For ease of understanding, FIG. 8 is a schematic diagram of frequency domain resource sets according to an embodiment of this application. The second sidelink resource pool is used to send an energy-saving signal and sidelink information. Another resource pool (for example, a resource pool N) is used to send sidelink information, other data, or signaling. Specifically, the energy-saving signal can be sent on any configured resource, for example, any one or more resource pools in resource pool 1 to resource pool N, where N is a positive integer.

Further, the energy-saving signal occupies $N_{freq}$ frequency domain units, and the frequency domain unit is a subchannel, a resource block, or a resource block interlace (RB interlace), where $N_{freq}$ is a positive integer greater than or equal to 1, and a value of $N_{freq}$ is pre-defined, or is configured by a network apparatus, or is pre-configured. Specifically, $N_{freq}$ may be configured by the network apparatus, and include being configured by using RRC signaling or a SIB message, and in another implementation solution, may alternatively be indicated by the network apparatus by using DCI signaling. $N_{freq}$ may alternatively be pre-configured (Pre-configuration). For example, $N_{freq}$ is pre-configured when the first terminal apparatus is delivered from a factory, and $N_{freq}$ may alternatively be pre-defined, for example, defined in a communication standard protocol or a regional/national law/specification, and does not need to be obtained through configuration, indication, or calculation. This is not limited herein.

In another possible implementation, some or all resources in the frequency domain resource set belong to a resource of PSFCH. In other words, some or all resources in the frequency domain resource set use frequency domain resources of the PSFCH. Further, a resource of a first feedback belongs to the frequency domain resource of the PSFCH, the frequency domain resource set does not overlap the resource of the first feedback, and the first feedback includes one or more of the following: a hybrid automatic repeat request HARQ feedback, a channel state information CSI feedback, and sidelink assistance information or synchronization information, for example, a synchronization information block (S-SSB). The sidelink assistance information includes a sidelink resource recommended for use, a sidelink resource not recommended for use, a sidelink resource collision indication, a sidelink resource reservation collision indication, an indication indicating that a half-duplex collision has occurred or is to occur in the future, and the like.

(2) Time Domain Resource Set

The time domain resource set includes $$N_{time}^{1}$$

slots, where $$N_{time}^{1} \geq 1, N_{time}^{1}$$

is a positive integer, and a value of $$N_{time}^{1}$$

is pre-defined, or is configured by a network apparatus, or is pre-configured. Specifically, a value of $$N_{time}^{1}$$

may be configured by the network apparatus, and include being configured by using RRC signaling or a SIB message, and in another implementation solution, may alternatively be indicated by the network apparatus by using DCI signaling. The value of $$N_{time}^{1}$$

may alternatively be pre-configured (Pre-configuration). For example, the value of $$N_{time}^{1}$$

is pre-configured when the first terminal apparatus is delivered from a factory, and the value of $$N_{time}^{1}$$

may alternatively be pre-defined, for example, defined in a communication standard protocol or a regional/national law/specification, and does not need to be obtained through configuration, indication, or calculation. This is not limited herein.

Further, each of the $$N_{time}^{1}$$

slots includes $$N_{time}^{2}$$

symbols, $$N_{time}^{2} \geq 2, N_{time}^{2}$$

is a positive integer, and a value of $$N_{time}^{2}$$

is pre-defined, or is configured by the network apparatus, or is pre-configured. Specifically, a value of $$N_{time}^{2}$$

may be configured by the network apparatus, and include being configured by using RRC signaling or a SIB message, and in another implementation solution, may alternatively be indicated by the network apparatus by using DCI signaling. The value of $$N_{time}^2$$

may alternatively be pre-configured (Pre-configuration). For example, the value of $$N_{time}^2$$

is pre-configured when the first terminal apparatus is delivered from a factory, and the value of $$N_{time}^2$$

may alternatively be pre-defined, for example, defined in a communication standard protocol or a regional/national law/specification, and does not need to be obtained through configuration, indication, or calculation. This is not limited herein.

It may be understood that a time unit of the time domain resource set may be another time unit such as a mini-slot. The time domain resource set may include $X_{mini\text{-}slot}$ slots, where $X_{mini\text{-}slot}$ is a positive integer. A value of $X_{mini\text{-}slot}$ is pre-defined, or is configured by the network apparatus, or is pre-configured. Specifically, $X_{mini\text{-}slot}$ may be configured by the network apparatus, and include being configured by using RRC signaling or a SIB message, and in another implementation solution, may alternatively be indicated by the network apparatus by using DCI signaling. $X_{mini\text{-}slot}$ may alternatively be pre-configured (Pre-configuration). For example, $X_{mini\text{-}slot}$ is pre-configured when the first terminal apparatus is delivered from a factory, and $X_{mini\text{-}slot}$ may alternatively be pre-defined, for example, defined in a communication standard protocol or a regional/national law/specification, and does not need to be obtained through configuration, indication, or calculation. This is not limited herein.

The resource configuration information may further determine a plurality of time domain resource sets and a time domain offset between the plurality of time domain resource sets. For example, the resource configuration information may configure, in 100 slots, one or more time domain resource sets used to send the energy-saving signal in a periodicity of every 100 slots.

With reference to the accompanying drawings, the following uses system frame numbers (SFN) of one periodicity or direct connection system frame numbers (Direct Frame Number) of one periodicity as an example for description.

Figure 9:
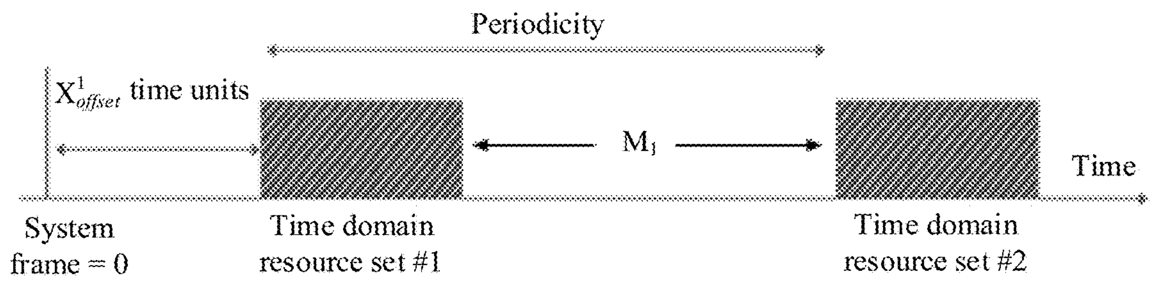
FIG. 9 is a schematic diagram of time domain resource sets according to an embodiment of this application.

First, FIG. 9 is a schematic diagram of time domain resource sets according to an embodiment of this application. The system frame numbers of one periodicity include at least two time domain resource sets, and the system frame numbers of one periodicity include 1024 system frame numbers. In the at least two time domain resource sets, a time domain offset between a start position of a first time domain resource set and a system frame number whose system frame number is 0 is $$X_{offset}^1$$

time units, a time domain interval between every two adjacent time domain resource sets is $M_1$ time units, where $M_1$ is a positive integer greater than or equal to 1, and values of $$X_{offset}^1$$

and $M_1$ are pre-defined, or are configured by a network apparatus, or are pre-configured. Specifically, values $$X_{offset}^1$$

and $M_1$ may be configured by the network apparatus, and include being configured by using RRC signaling or a SIB message, and in another implementation solution, may alternatively be indicated by the network apparatus by using DCI signaling. The values of $$X_{offset}^1$$

and $M_1$ may alternatively be pre-configured (Pre-configuration). For example, the values of $$X_{offset}^1$$

and $M_1$ are pre-configured when the first terminal apparatus is delivered from a factory, and the values of $$X_{offset}^1$$

and $M_1$ may alternatively be pre-defined, for example, defined in a communication standard protocol or a regional/national law/specification, and does not need to be obtained through configuration, indication, or calculation. This is not limited herein.

Figure 10:
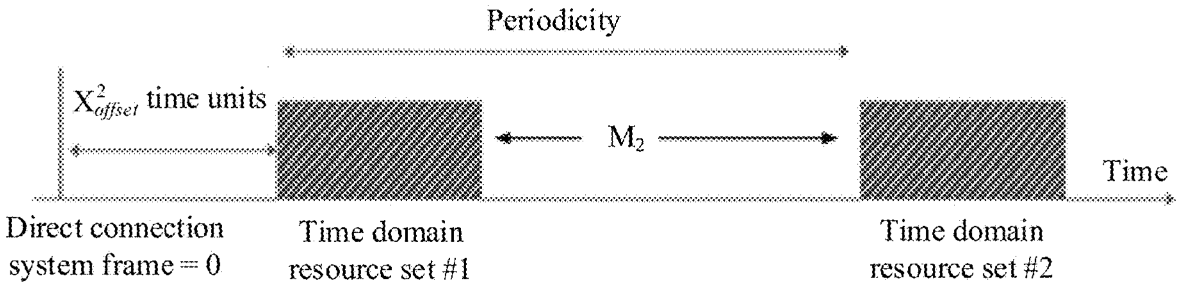
FIG. 10 is a schematic diagram of time domain resource sets according to an embodiment of this application.

Alternatively, FIG. 10 is a schematic diagram of time domain resource sets according to an embodiment of this application. The direct connection system frame numbers of one periodicity include 1024 direct connection system frame numbers. In at least two time domain resource sets, a time domain offset between a start position of a first time domain resource set and a direct connection system frame number whose direct connection system frame number is 0 is $$X_{offset}^2$$

time units, a time domain interval between every two adjacent time domain resource sets is $M_2$ time units, where $M_2$ is a positive integer greater than or equal to 1, and values of $$X_{offset}^2$$

and $M_2$ are pre-defined, or are configured by a network apparatus, or are pre-configured. Specifically, values of $$X_{offset}^2$$

and $M_2$ may be configured by the network apparatus, and include being configured by using RRC signaling or a SIB message, and in another implementation solution, may alternatively be indicated by the network apparatus by using DCI signaling. The values of $$X_{offset}^2$$

and $M_2$ may alternatively be pre-configured (Pre-configuration). For example, the values of $$X_{offset}^2$$

and $M_2$ are pre-configured when the first terminal apparatus is delivered from a factory, and the values of $$X_{offset}^2$$

and $M_2$ may alternatively be pre-defined, for example, defined in a communication standard protocol or a regional/national law/specification, and does not need to be obtained through configuration, indication, or calculation. This is not limited herein.

Figure 11:
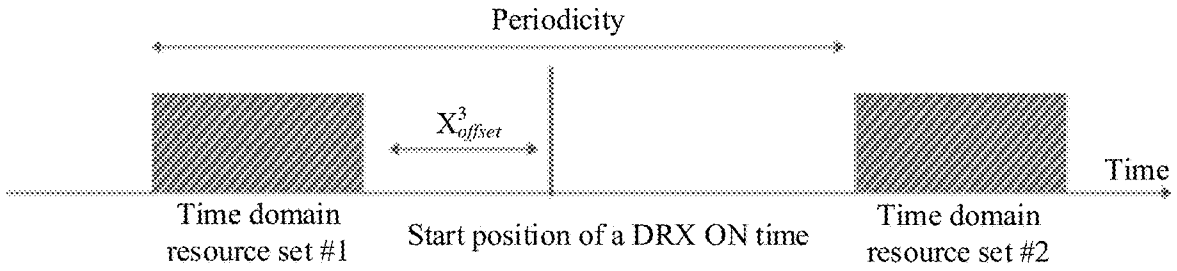
FIG. 11 is a schematic diagram of time domain resource sets according to an embodiment of this application.

Alternatively, FIG. 11 is a schematic diagram of time domain resource sets according to an embodiment of this application. A first terminal apparatus obtains sidelink-discontinuous reception SL-DRX configuration information of a second terminal apparatus, the SL-DRX configuration information indicates a discontinuous reception on DRX ON time period, and the second terminal apparatus receives sidelink information from the first terminal apparatus in the DRX ON time period.

Optionally, the SL-DRX configuration information is configured by the first terminal apparatus to the second terminal apparatus, so that the first terminal apparatus obtains the SL-DRX configuration information from the first terminal apparatus. Alternatively, the SL-DRX configuration information is sent from the second terminal apparatus to the first terminal apparatus. Alternatively, the SL-DRX configuration information is configured by a network apparatus to the first terminal apparatus. Alternatively, the SL-DRX configuration information is pre-configured. A time domain offset between a start position of the time domain resource set and a start position of the DRX ON time period is $$X_{offset}^3$$

time units, and a value of $$X_{offset}^3$$

is pre-defined, or is configured by the network apparatus, or is pre-configured, where $$X_{offset}^3$$

is a positive integer. Specifically, $$X_{offset}^3$$

may be configured by the network apparatus, and include being configured by using RRC signaling or a SIB message, and in another implementation solution, may alternatively be indicated by the network apparatus by using DCI signaling.

$$X_{offset}^3$$

may alternatively be pre-configured (Pre-configuration). For example, $$X_{offset}^3$$

is pre-configured when the first terminal apparatus is delivered from a factory, and $$X_{offset}^3$$

may alternatively be pre-defined, for example, defined in a communication standard protocol or a regional/national law/specification, and does not need to be obtained through configuration, indication, or calculation. This is not limited herein.

Further, a manner in which the first terminal apparatus obtains sidelink discontinuous reception SL-DRX configuration information of the second terminal apparatus includes: The first terminal apparatus determines the SL-DRX configuration information of the second terminal apparatus, and sends the SL-DRX configuration information to the second terminal apparatus by using PC5 RRC signaling, a sidelink MAC control element, or sidelink control information, where a PC5 interface is an interface between a road-side unit (RSU) and a vehicle or between vehicles; and the first terminal apparatus receives the SL-DRX configuration information of the second terminal apparatus from the second terminal apparatus; or obtains the SL-DRX configuration information of the second terminal apparatus by using a network apparatus; or obtains the SL-DRX configuration information of the second terminal apparatus by using pre-configured SL-DRX configuration information.

The time unit may be a frame, a slot, a mini-slot, or a symbol. This is not limited herein.

Further, the $$N_{time}^2$$

symbols include one or more first time units, and each first time unit includes at least one first symbol and at least one second symbol. The first symbol is used for automatic gain control (AGC) training of the second terminal apparatus, so that the second terminal apparatus adjusts receiving strength based on an AGC training result. The second symbol is used to send the energy-saving signal; and a last sub-time unit of the at least one first symbol is adjacent to a first sub-time unit of the at least one second symbol in time domain.

Figure 12:
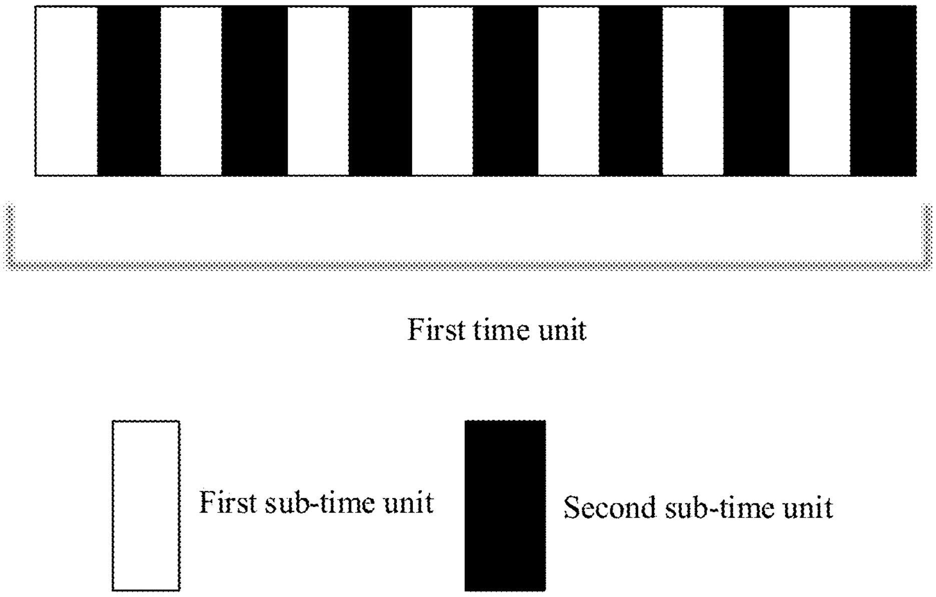
FIG. 12 is a schematic diagram of a first time unit according to an embodiment of this application.

For ease of understanding, FIG. 12 is a schematic diagram of a first time unit according to an embodiment of this application. One slot is used as an example. The one slot includes seven first time units, each first time unit includes one first symbol and one second symbol, and the first symbol and the second symbol alternately appear in time domain. In a same first time unit, the first symbol is adjacent to the second symbol in time domain. The first symbol is used to send an energy-saving signal.

Optionally, the second symbol is AGC information, and information transmitted on the second symbol is copy information of information transmitted on the first symbol. For example, in a same first time unit, a same energy-saving signal is transmitted on the first symbol and the second symbol.

Optionally, the information transmitted on the second symbol may alternatively be redundant information, for example, a character string "10101010".

Figure 13:
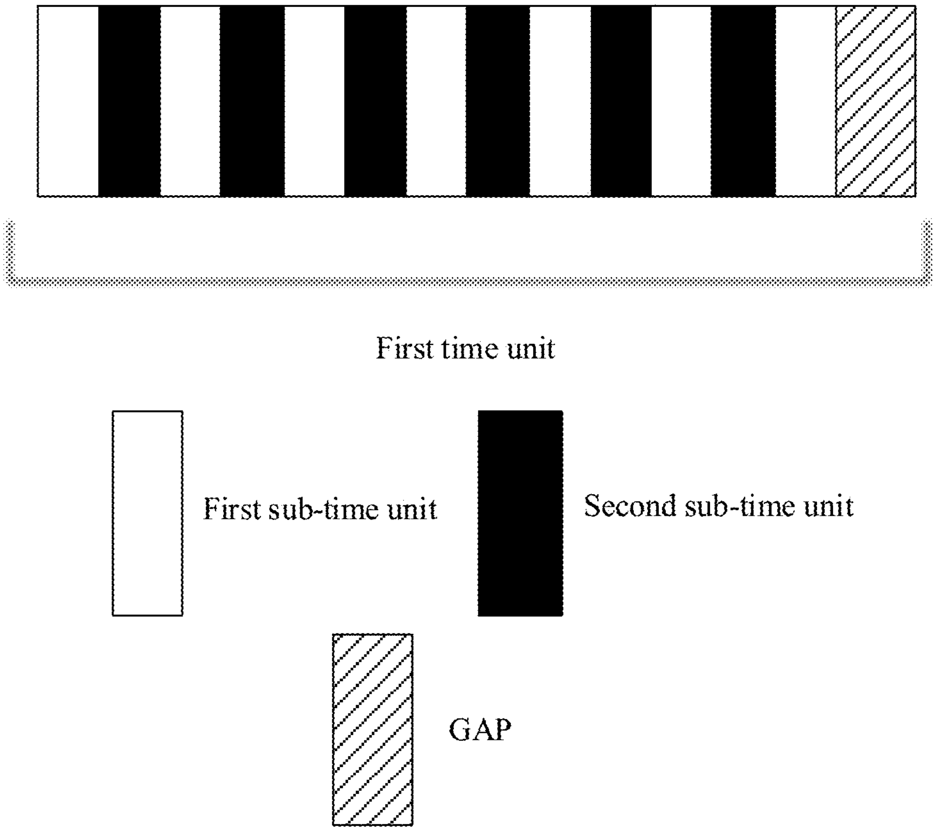
FIG. 13 is a schematic diagram of a first time unit according to an embodiment of this application.

Optionally, in order to consider a sidelink transmission problem, a gap symbol (gap symbol) is set as a last symbol of a slot for transmitting the energy-saving signal. The gap symbol indicates a receive end to perform receive/transmit conversion processing. For ease of understanding, FIG. 13 is a schematic diagram of a first time unit according to an embodiment of this application. A length of the first time unit is one slot (14 symbols). The first time unit includes six pairs of first symbols and second symbols, and a last bit of the first time unit is a gap symbol. No data may be transmitted in the gap symbol.

In another possible implementation, some or all resources in a time domain resource set belong to time domain resources of a physical sidelink feedback channel PSFCH. In other words, some or all resources in the time domain resource set use time domain resources of the PSFCH. For example, each of $$N_{time}^{1}$$

slots includes a time domain resource of the physical sidelink feedback channel PSFCH; and the time domain resource of the PSFCH is used to send the energy-saving signal.

For example, the time unit in the time domain resource set is a slot, and the frequency domain resource set includes at least one PSFCH slot. For another example, the time domain resource set includes two consecutive time units (the time unit is a slot), and one of the two consecutive time units belongs to resources of the PSFCH. For still another example, the time domain resource set includes two time units at an interval (the time unit is a slot), and the two time units at an interval belong to resources of the PSFCH.

(3) Code Domain Resource Set

The energy-saving signal includes an energy-saving signal sequence, that is, the energy-saving signal can be represented by a sequence. The energy-saving signal sequence may be a low signal peak-to-average power ratio (PAPR) sequence, such as a ZC (Zadoff-Chu) sequence.

The first terminal apparatus determines $CS_m$ cyclic shift values based on the resource configuration information. The code domain resource set includes $CS_m$ cyclic shift values, the cyclic shift values are used to generate the energy-saving signal sequence, and each pair of cyclic shift values in the $CS_m$ cyclic shift values indicates the second terminal apparatus to listen to the sidelink information or indicates the second terminal apparatus to go to sleep, where $CS_m \geq 2i$, and i is a positive integer. The sidelink information may be from the first terminal apparatus. For example, the sidelink information may be sidelink control information, for example, SCI information carried on a PSCCH, or may be data information and/or control information carried on a PSSCH, or may be information carried on a PSFCH, including hybrid automatic repeat request (HARQ) feedback information, channel state information (CSI) feedback information, SL assistance information and other indication information, or may be synchronization information, for example, a synchronization information block (S-SSB).

For example, if the frequency domain resource set includes 1 RB and the time domain resource set includes 1 symbol, cyclic shift values includes a total of 12 integers between 0 and 11: $CS_m = \{0, 1, 2, 3, 4, 5, 6, 7, 8, 9, 10, 11\}$.

For example, the energy-saving signal includes a WUS and a GTS. WUS and GTS are a pair. CS values $0+m_0$ and $6+m_0$ are a pair. $0+m_0$ indicates the WUS; and $6+m_0$ indicates a GTS, where $m_0=0, 1, 2, 3, 4, 5$. For example, as shown in Table 1:

TABLE 1

| WUS $(0 + m_0)$ | GTS $(6 + m_0)$ |
|---|---|
| 0 | 6 |
| 1 | 7 |
| 2 | 8 |
| 3 | 9 |
| 4 | 10 |
| 5 | 11 |

In another possible implementation, some or all code domain resources in the code domain resource set use code domain resources of the PSFCH. Further, a resource of a first feedback belongs to the code domain resource of the PSFCH, the code domain resource set does not overlap the resource of the first feedback, and the first feedback includes one or more of the following: a hybrid automatic repeat request HARQ feedback, a channel state information CSI feedback, and sidelink assistance information or synchronization information, for example, a synchronization information block (S-SSB). The sidelink assistance information includes a sidelink resource recommended for use, a sidelink resource not recommended for use, a sidelink resource collision indication, a sidelink resource reservation collision indication, an indication indicating that a half-duplex collision has occurred or is to occur in the future, and the like.

404: Determine a first resource based on the identifier information and the first resource set.

In step 404, after the first terminal apparatus determines the first resource set, the first terminal device determines the first resource based on the identifier information and the first resource set. The first resource is used to send the energy-saving signal to the second terminal apparatus.

The first terminal apparatus determines a total quantity of resources in the first resource set, and the total quantity of resources includes one or more of the following: a total quantity of frequency domain resource sets, a total quantity of time domain resource sets, or a total quantity of code domain resource sets. That is, the total quantity of resources is a total quantity of resources (including frequency domain resources, time domain resources, and/or code domain resources) that can be used by one energy-saving signal in one periodicity. The total quantity of resources may be a product of the total quantity of frequency domain resource sets, the total quantity of time domain resource sets, and the total quantity of code domain resource sets.

The first terminal apparatus determines the first resource based on the total quantity of resources, the first sequence, and the identifier information. The first sequence is referred to as an index sequence of the total quantity of resources. For example, the first sequence can be as follows: the frequency domain resource, the time domain resource, and the code domain resource. The first sequence may alternatively be as follows: the time domain resource, the frequency domain resource, and the code domain resource. The first sequence may alternatively be as follows: the code domain resource, the frequency domain resource, and the time domain resource. This is not limited herein. The identifier information includes one or more of the following: source identifier information, destination identifier information, or a group member identifier. The source identifier information includes: an identifier of the first terminal apparatus, or an identifier of a terminal apparatus that initiates a service, or an identifier of a terminal apparatus that sends data; the destination identifier information includes: an identifier of the second terminal apparatus, or an identifier of a terminal apparatus that receives a service, or an identifier of a terminal apparatus that receives data; and the group member identifier is an identifier of a group member in a multicast. From a perspective of a physical layer, the data may be data transmitted on a PSSCH.

In a possible implementation, sorting may be performed in a specific sequence in one frequency domain resource (for example, an SL-BWP, a resource pool, a channel, or each subchannel), and then sorting is performed in a specific sequence in a next frequency domain resource (for example, an SL-BWP, a resource pool, a channel, or each subchannel), and the first sequence is determined by analogy.

An example is used for description. The total quantity of frequency domain resources is denoted as $PS_{RB}$, the total quantity of time domain resources is denoted as $PS_{slot}$, the total quantity of code domain resources is denoted as $PS_{CS}$, the source identifier information in the identifier information is denoted as $ID_{src}$, and the destination identifier information in the identifier information is denoted as $ID_{dest}$. A finally determined index of the first resource is denoted as $PS_{idx}$. The total quantity of resources is $(PS_{RB}\times PS_{CS}\times PS_{CS})$.

The index of the first resource satisfies a function $PS_{idx}=f(ID_{src},ID_{dest},PS_{RB},PS_{slot},PS_{CS})$.

In a possible example, $PS_{idx}=(ID_{src}+ID_{dest})\bmod(PS_{RB}\times PS_{slot}\times PS_{CS})$.

Alternatively, the index of the first resource satisfies a function $PS_{idx}=f(ID_{src},PS_{RB},PS_{slot},PS_{CS})$ or $f(ID_{dest},PS_{RB},PS_{slot},PS_{CS})$.

In a possible example, $PS_{idx}=(ID_{src})\bmod(PS_{RB}\times PS_{slot}\times PS_{CS})$ or $PS_{idx}=(ID_{dest})\bmod(PS_{RB}\times PS_{slot}\times PS_{CS})$.

Figure 14:
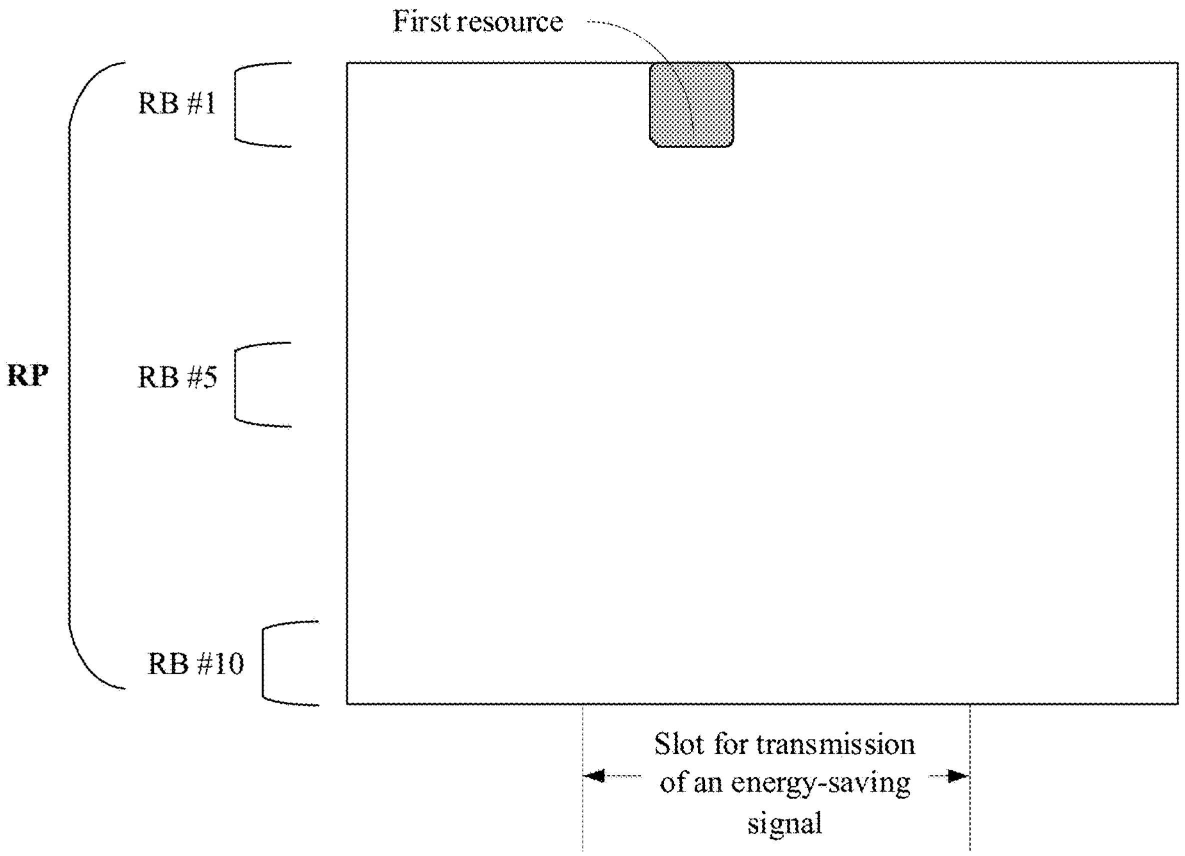
FIG. 14 is a schematic diagram of determining a first resource according to an embodiment of this application.

For ease of understanding, an example is used for description with reference to the accompanying drawings. FIG. 14 is a schematic flowchart of determining a first resource according to an embodiment of this application. A frequency domain resource includes 10 PRBs, that is, $PS_{RB}=10$. A time domain resource set includes one slot, and the slot includes seven symbols for sending an energy-saving signal and a corresponding symbol for sending AGC information, that is, $PS_{slot}=7$ (a last bit includes one GAP symbol). A code domain resource includes six pairs of cyclic shift values, that is, $PS_{CS}=6$. Specifically, a first pair of $ID_{src}$ and $ID_{dest}$ is $ID_{src}$=0000 0111 and $ID_{dest}$=0000 0000 000 0010. When being converted from a binary value to a decimal value, $ID_{src}=8$, $ID_{dest}=3$. Further, an index of the first resource $PS_{idx}=(8+3)\bmod(10*7*6)=11$. The first resource is: a second pair of CSs of a first RB, where $m_{cs}=1$, indicating to wake up.

Figure 15:
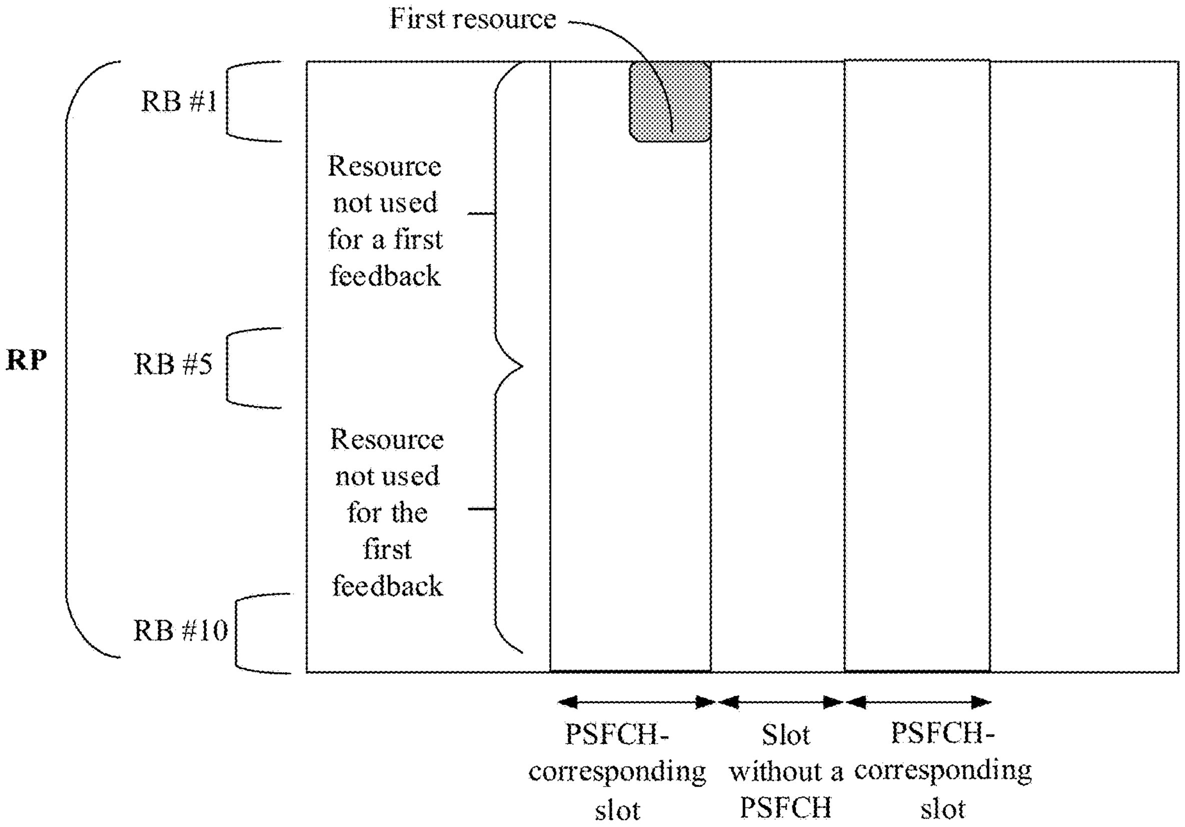
FIG. 15 is another schematic diagram of determining a first resource according to an embodiment of this application.

In another possible implementation, the first resource belongs to resources of a PSFCH. In this case, determining the first resource is shown in FIG. 15. FIG. 15 is still another schematic diagram of determining a first resource according to an embodiment of this application. A time domain resource set includes two time units at an interval (the time unit is a slot), and the two time units at an interval belong to the resources of the PSFCH. In time domain, slots corresponding to the PSFCH are discontinuous (or not adjacent), and there is an interval between two slots (the slots corresponding to the PSFCH) without a PSFCH. A code domain resource set belongs to code domain resources of the PSFCH. The frequency domain resource set belongs to frequency domain resources that are not used for the first feedback (the frequency domain resource set also belongs to frequency domain resources that belong to the PSFCH).

405: The first terminal apparatus sends the energy-saving signal to the second terminal apparatus on the first resource.

In step 405, after the first terminal apparatus determines the first resource, the first terminal apparatus sends the energy-saving signal to the second terminal apparatus on the first resource.

Specifically, the second terminal apparatus determines the first resource based on the resource configuration information and the identifier information, and the second terminal apparatus receives the energy-saving signal from the first terminal apparatus on the first resource. A step in which the second terminal apparatus determines the first resource is similar to the step in which the first terminal apparatus determines the first resource in the foregoing steps 401 to 404, and details are not described herein again.

When the energy-saving signal received by the second terminal apparatus indicates the second terminal apparatus to go into a sleep state, the second terminal apparatus enters the sleep state, to reduce power consumption. When the energy-saving signal received by the second terminal apparatus indicates the second terminal to wake up, the second terminal apparatus wakes up and listens to the sidelink information from the first terminal apparatus. The energy-saving signal may be a WUS, or may be a GTS, or may be a variant of the WUS or the GTS, which is not limited herein. For example, the energy-saving signal may be carried in control information, and is a field whose size is 1 bit. A different value of the bit indicates that the energy-saving signal indicates the second terminal apparatus to wake up (for example, a value of the bit is "1") or indicates the second terminal apparatus to go to sleep (for example, a value of the bit is "0"). The energy-saving signal includes an energy-saving signal sequence, that is, the energy-saving signal may be represented by a sequence, and may be carried in a PSFCH, or carried in a PSSCH, or carried in a physical sidelink energy-saving channel (dedicated to a physical sidelink channel for sending an energy-saving signal), or sent in a form of a signal (in this case, a resource of the energy-saving signal does not belong to a resource of the physical sidelink channel). For example, the energy-saving sequence may be a ZC sequence, and an energy-saving signal sequence generated by using different cyclic shift values may indicate that the energy-saving signal sequence indicates the second terminal apparatus to wake up or indicates the second terminal apparatus to go to sleep.

Optionally, after the second terminal apparatus goes into the sleep state, the second terminal apparatus wakes up until there is a first resource corresponding to a next energy-saving signal, and retrieves the energy-saving signal (or listens to the energy-saving signal). The first resource is determined by the second terminal apparatus based on the resource configuration information and the identifier information. Specifically, a manner in which the second terminal apparatus determines the first resource is similar to a manner in which the first terminal apparatus determines the first resource. Details are not described herein again.

The second terminal apparatus wakes up by receiving the energy-saving signal on the first resource. If the second terminal apparatus receives the energy-saving signal and the energy-saving signal indicates the second terminal apparatus to wake up, the second terminal apparatus wakes up in a DRX ON time period corresponding to the energy-saving signal, or the second terminal apparatus wakes up after a period of time. The period of time (at least a time length corresponding to one slot) may be indicated by the first terminal apparatus; determined by the second terminal apparatus; determined by the second terminal apparatus based on configuration information received from a network apparatus; or pre-configured or pre-defined. The woken-up second terminal apparatus may perform PSCCH detection and decoding on all sidelink bandwidth parts or resource pools, and further decode the PSSCH according to decoded PSCCH information. Specifically, the second terminal apparatus determines the DRX ON time period based on the SL-DRX configuration information of the second terminal apparatus. The second terminal apparatus can obtain the SL-DRX configuration information of the second terminal apparatus in a plurality of manners that include but not limited to: The second terminal apparatus receives the SL-DRX configuration information of the second terminal apparatus from the first terminal apparatus. The second terminal apparatus obtains the SL-DRX configuration information of the second terminal apparatus from the second terminal apparatus; the second terminal apparatus receives the SL-DRX configuration information of the second terminal apparatus from a network apparatus; or the SL-DRX configuration information of the second terminal apparatus is pre-configured.

The second terminal apparatus wakes up by receiving the energy-saving signal on the first resource. If the second terminal apparatus receives the energy-saving signal and the energy-saving signal indicates the second terminal apparatus to go to sleep, the second terminal apparatus enters a sleep state until there is a first resource corresponding to a next energy-saving signal, and wakes up to receive the energy-saving signal. Optionally, the second terminal apparatus discards the SL-DRX configuration information of the second terminal apparatus between a moment at which the energy-saving signal indicates the second terminal apparatus to go to sleep and a moment at which there is a first resource corresponding to a next energy-saving signal for waking up to receive the energy-saving signal. To be specific, the second terminal apparatus does not wake up within the SL-DRX active time.

Optionally, after being woken up, the second terminal apparatus may go to sleep if one or more of the following conditions are met. Optionally, after the second terminal apparatus enters the sleep state, the second terminal apparatus wakes up until a first resource corresponding to a next energy-saving signal, and retrieves the energy-saving signal (or listens to the energy-saving signal).

The conditions include the following:

a. A first timing $$T^1_{timer}$$

is defined in an SL-DRX ON time period and/or at least one SL-DRX timing period or a time domain resource set corresponding to an energy-saving signal, where a unit of the first timing may be represented by milliseconds (ms) or slots, for example, $$T^1_{timer} = x1 \text{ (ms) or } T^1_{timer} = y1 \text{ slots},$$

where x1 and y1 are integers greater than 0. A first start position $T_1$ of start position bits in an SL-DRX ON time period and/or at least one SL-DRX timing time period, or a time domain resource set corresponding to an energy-saving signal is defined, and in a time period from $T_1$ and $$T_1 + T^1_{timer},$$

and if the second terminal does not receive a PSSCH that includes data or a service whose destination is the second terminal apparatus, the second terminal apparatus determines whether a destination of data or a service carried in the PSSCH is the second terminal apparatus based on the identifier information.

b. If the second terminal apparatus does not receive a PSSCH that includes data or a service whose destination is the second terminal apparatus within a second timing $$T^2_{timer}$$

time period after the second terminal apparatus wakes up, the second terminal apparatus determines based on the identifier information, whether a destination of data or a service carried in the PSSCH is the second terminal apparatus, where $$T^2_{timer} = x2 \text{ (ms) or } T^2_{timer} = y2 \text{ slots},$$

and x2 and y2 are integers greater than 0.

c. An indication indicating the second terminal apparatus to go into a sleep state is received, where the indication includes an energy-saving signal.

d. The first terminal apparatus does not reserve a transmission resource for the second terminal apparatus in the SCI sent by the first terminal apparatus.

e. The second terminal apparatus correctly receives data sent by the first terminal apparatus, where the data is carried in the PSSCH.

In this embodiment of this application, according to the foregoing method, the first terminal apparatus determines, based on the identifier information and the resource configuration information, the resource for sending the energy-saving signal, so that the destination of the energy-saving signal, namely, the second terminal apparatus, may learn of the source of the energy-saving signal, and the second terminal apparatus may receive the energy-saving signal on the specified resource. The second terminal apparatus wakes up or goes to sleep based on the energy-saving signal, to reduce power consumption.

Figure 16:
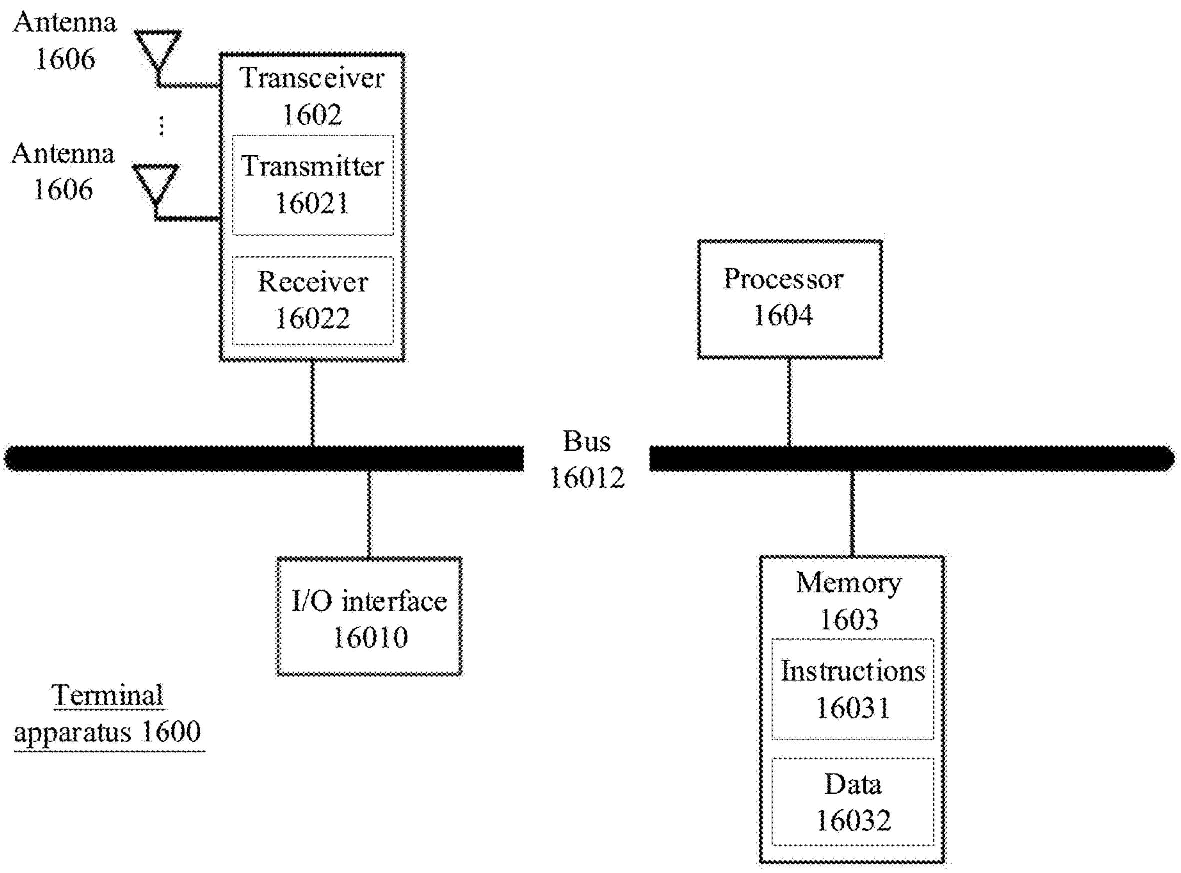
FIG. 16 is a schematic diagram of a hardware structure of a terminal apparatus according to an embodiment of this application.

To implement the foregoing embodiments, embodiments of this application further provide a terminal apparatus. FIG. 16 is a schematic diagram of a hardware structure of a terminal apparatus according to an embodiment of this application. Although the terminal apparatus 1600 shows some specific features, a person skilled in the art may be aware, from embodiments of this application, that, for brevity, FIG. 16 does not show various other features, to avoid confusing more related aspects of implementations disclosed in embodiments of this application. For example, in some implementations, the terminal apparatus includes at least a processor 1604 and a memory 1603. The memory 1603 is configured to store instructions 16031 and/or data 16032. Optionally, the terminal apparatus includes an input/output (I/O) interface 16010, and a bus 16012. Optionally, the terminal apparatus may further include a transceiver 1602 and an antenna 1606. The transceiver 1602 further includes a transmitter 16021 and a receiver 16022. In addition, the processor 1604, the transceiver 1602, the memory 1603, and the I/O interface 16010 are communicatively connected to each other through the bus 16012. The antenna 1606 is connected to the transceiver 1602.

The processor 1604 may be a general-purpose processor, for example, but not limited to a central processing unit (CPU), or may be a dedicated processor, for example, but not limited to a digital signal processor (DSP), an application-specific integrated circuit (ASIC), and a field programmable gate array (FPGA). Alternatively, the processor 1604 may be a neural-network processing unit (NPU). In addition, the processor 1604 may alternatively be a combination of a plurality of processors. Particularly, in the technical solutions provided in embodiments of this application, the processor 1604 may be configured to perform related steps of the communication method in a subsequent method embodiment. The processor 1604 may be a processor specifically designed to perform the foregoing steps and/or operations, or may be a processor that performs the foregoing steps and/or operations by reading and executing the instructions 16031 stored in the memory 1603. The processor 1604 may need to use data 16032 in a process of performing the foregoing steps and/or operations.

The transceiver 1602 includes a transmitter 16021 and a receiver 16022. In an optional implementation, the transmitter 16021 is configured to send a signal through the antenna 1606. The receiver 16022 is configured to receive a signal by using at least one of the antennas 1606. Particularly, in the technical solutions provided in embodiments of this application, the transmitter 16021 may be specifically implemented by at least one of the antennas 1606.

In this embodiment of this application, the transceiver 1602 is configured to support the terminal apparatus in performing the foregoing receiving function and sending function. A processor having a processing function is considered as the processor 1604. The receiver 16022 may also be referred to as an input port, a receiving circuit, or the like. The transmitter 16021 may be referred to as a transmitter, a transmitting circuit, or the like.

The processor 1604 may be configured to execute instructions stored in the memory 1603, to control the transceiver 1602 to receive a message and/or send a message, to realize a function of the terminal apparatus in the method embodiment of this application. In an implementation, it may be considered that a function of the transceiver 1602 is implemented by using a transceiver circuit or a dedicated transceiver chip. In this embodiment of this application, that the transceiver 1602 receives a message may be understood as that the transceiver 1602 inputs a message, and that the transceiver 1602 sends a message may be understood as that the transceiver 1602 outputs a message.

The memory 1603 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 1603 is specifically configured to store the instructions 16031 and the data 16032. The processor 1604 may perform the steps and/or the operations in the method embodiments of this application by reading and executing the instructions 16031 stored in the memory 1603. The data 16032 may need to be used in a process of performing the operations and/or the steps in the method embodiment of this application.

In some implementations, the memory 1603 or a non-temporal computer-readable storage medium of the memory 1603 stores the following programs, modules, and data structures, or subsets thereof, including, for example, a transceiver module (not shown) and a processing module (not shown).

In a possible embodiment, the terminal apparatus 1600 may include any of the functions in the first terminal apparatus in the method embodiment corresponding to FIG. 4 to FIG. 15 above.

It should be understood that the terminal apparatus 1600 corresponds to the first terminal apparatus in the above method embodiment, and the steps and methods implemented by each module in the terminal apparatus 1600 and the other operations and/or functions mentioned above in order to implement the first terminal apparatus in the above method embodiment can be found in the corresponding method embodiment in FIG. 4 to FIG. 15.

In a possible embodiment, the terminal apparatus 1600 may include any of the functions in the second terminal apparatus in the method embodiment corresponding to FIG. 4 to FIG. 15 above.

It should be understood that the terminal apparatus 1600 corresponds to the second terminal apparatus in the above method embodiment, and the steps and methods implemented by each module in the terminal apparatus 1600 and the other operations and/or functions mentioned above in order to implement the second terminal apparatus in the above method embodiment can be found in the method embodiment corresponding to FIG. 4 to FIG. 15 above.

In various implementations, the terminal apparatus 1600 is used to execute the communication method provided in embodiments of this application, for example, the communication method corresponding to the embodiment shown above in FIG. 4 to FIG. 15.

An embodiment of this application further provides a computer-readable storage medium, which includes instructions. When the instructions are run on a computer, the computer controls the terminal apparatus to perform any implementation shown in the foregoing method embodiments.

An embodiment of this application further provides a computer program product. The computer program product includes computer program code. When the computer program code is run on a computer, the computer performs any implementation shown in the foregoing method embodiments.

Further, embodiments of this application further provide a computer program product, and when the computer program product runs on a terminal apparatus, the terminal apparatus is enabled to execute the method executed by the first terminal apparatus or the second terminal apparatus in the method embodiment corresponding to FIG. 4 to FIG. 15 above.

An embodiment of this application further provides a chip system. The chip system includes a processor and an interface circuit. The interface circuit is configured to receive instructions and transmit the instructions to the processor. The processor is configured to perform the method according to any one method embodiment above.

Optionally, the chip system includes a memory, and there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and implement the method according to any one method embodiment above by reading software code stored in the memory.

Optionally, there may alternatively be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

Embodiments of this application are described in detail above. The steps of the method in embodiments of this application may be sequentially scheduled, combined, or deleted based on an actual requirement. The modules in the apparatus in embodiments of this application may be divided, combined, or deleted based on an actual requirement.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout this specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The term "and/or" in this specification describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined according to A. However, it should be further understood that, determining B based on A does not mean that B is determined only based on A, and B may also be determined based on A and/or other information.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In several embodiments provided in this application, it should be understood that the disclosed system, apparatus, and method may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, in other words, may be located in one location, or may be distributed on a plurality of network units. Some or all of the units may be selected depending on actual requirements to achieve the objectives of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

What is claimed is:

1. A communication method applied to a first terminal apparatus, wherein the method comprises:

obtaining identifier information, wherein the identifier information identifies at least one of the following: the first terminal apparatus, a second terminal apparatus, a service of the first terminal apparatus, data of the first terminal apparatus, a service of the second terminal apparatus, or data of the second terminal apparatus;

obtaining resource configuration information, wherein the resource configuration information is used to determine a first resource set of an energy-saving signal, the first resource set comprises at least one of the following: a frequency domain resource set, a time domain resource set, or a code domain resource set, and the energy-saving signal indicates the second terminal apparatus to wake up or indicates the second terminal apparatus to go to sleep, wherein the energy-saving signal is represented by an energy-saving signal sequence generated by using different cyclic shift values $CS_m$ indicating that the energy-saving signal sequence is used to wake up or go to sleep, wherein a wake-up signal (WUS) and a going-to-sleep signal (GTS) are a pair, and each pair of the cyclic shift values indicates the second terminal apparatus to listen to sidelink information from the first terminal apparatus or indicates the second terminal apparatus to go to sleep, wherein $CS_m \geq 2i$, and i is a positive integer and m is an integer greater than or equal to 0;

determining a first resource based on the identifier information and the first resource set, wherein the first resource belongs to the first resource set; and sending the energy-saving signal to the second terminal apparatus on the first resource.

2. The method according to claim 1, wherein the frequency domain resource set comprises a first sidelink bandwidth part, and the first sidelink bandwidth part is used to send the energy-saving signal;

the frequency domain resource set comprises a second sidelink bandwidth part, and the second sidelink bandwidth part is used to send the energy-saving signal and the sidelink information;

the frequency domain resource set comprises a first sidelink resource pool, and the first sidelink resource pool is used to send the energy-saving signal; or the frequency domain resource set comprises a second sidelink resource pool, and the second sidelink resource pool is used to send the energy-saving signal and sidelink information.

3. The method according to claim 1, wherein the time domain resource set comprises $$N_{time}^1$$

slots, wherein $$N_{time}^1 \geq 1, N_{time}^1$$

is a positive integer, and a value of $$N_{time}^1$$

is pre-defined, or is configured by a network apparatus, or is pre-configured.

4. The method according to claim 3, wherein each of the $$N_{time}^1$$

slots comprises $$N_{time}^2$$

symbols, wherein $$N_{time}^2 \geq 2, N_{time}^2$$

is a positive integer, and a value of $$N_{time}^2$$

is pre-defined, or is configured by the network apparatus, or is pre-configured.

5. The method according to claim 4, wherein the $$N_{time}^2$$

symbols comprise one or more first time units, and each first time unit comprises at least one first symbol and at least one second symbol;

the first symbol is used by the second terminal apparatus to perform automatic gain control (AGC) training;

the second symbol is used to send the energy-saving signal; and a last symbol in the at least one first symbol is adjacent to a $1^{st}$ symbol in the at least one second symbol in time domain.

6. The method according to claim 3, wherein each of the $$N_{time}^1$$

slots comprises a time domain resource of a physical sidelink feedback channel (PSFCH); and the time domain resource of the PSFCH is used to send the energy-saving signal.

7. The method according to claim 1, further comprising:

determining a total quantity of resources in the first resource set, wherein the total quantity of resources includes one or more of the following: a total quantity of frequency domain resource sets, a total quantity of time domain resource sets, or a total quantity of code domain resource sets.

8. The method according to claim 7, further comprising:

determining the first resource based on the total quantity of resources, a first sequence, and the identifier information, wherein the first sequence is an index sequence of the total quantity of resources, and the identifier information includes one or more of the following: source identifier information, destination identifier information, or a group member identifier.

9. A communication method applied to a second terminal apparatus, wherein the method comprises:

obtaining identifier information, wherein the identifier information identifies at least one of the following: a first terminal apparatus, the second terminal apparatus, a service of the first terminal apparatus, data of the first terminal apparatus, a service of the second terminal apparatus, or data of the second terminal apparatus;

obtaining resource configuration information, wherein the resource configuration information is used to determine a first resource set of an energy-saving signal, the first resource set comprises at least one of the following: a frequency domain resource set, a time domain resource set, or a code domain resource set, and the energy-saving signal indicates the second terminal apparatus to wake up or indicates the second terminal apparatus to go to sleep, wherein the energy-saving signal is represented by an energy-saving signal sequence generated by using different cyclic shift values $CS_m$ indicating that the energy-saving signal sequence is used to wake up or go to sleep, wherein a wake-up signal (WUS) and a going-to-sleep signal (GTS) are a pair, and each pair of the cyclic shift values indicates the second terminal apparatus to listen to sidelink information from the first terminal apparatus or indicates the second terminal apparatus to go to sleep, wherein $CS_m \geq 2i$, and i is a positive integer and m is an integer greater than or equal to 0;

determining a first resource based on the identifier information and the first resource set, wherein the first resource belongs to the first resource set; and receiving the energy-saving signal from the first terminal apparatus on the first resource.

10. The method according to claim 9, wherein the frequency domain resource set comprises a first sidelink bandwidth part, and the first sidelink bandwidth part is used to receive the energy-saving signal;

the frequency domain resource set comprises a second sidelink bandwidth part, and the second sidelink bandwidth part is used to receive the energy-saving signal and the sidelink information;

the frequency domain resource set comprises a first sidelink resource pool, and the first sidelink resource pool is used to receive the energy-saving signal; or the frequency domain resource set comprises a second sidelink resource pool, and the second sidelink resource pool is used to receive the energy-saving signal and sidelink information.

11. The method according to claim 9, wherein the time domain resource set comprises $$N_{time}^{1}$$

slots, wherein $$N_{time}^{1} \geq 1, N_{time}^{1}$$

is a positive integer, and a value of $$N_{time}^{1}$$

is pre-defined, or is configured by a network apparatus, or is pre-configured.

12. The method according to claim 11, wherein each of the $$N_{time}^{1}$$

slots comprises $$N_{time}^{2}$$

symbols, wherein $$N_{time}^{2} \geq 2, N_{time}^{2}$$

is a positive integer, and a value of $$N_{time}^{2}$$

is pre-defined, or is configured by the network apparatus, or is pre-configured.

13. The method according to claim 12, wherein the $$N_{time}^{2}$$

symbols comprise one or more first time units, and each first time unit comprises at least one first symbol and at least one second symbol;

the first symbol indicates the second terminal apparatus to perform automatic gain control (AGC) training;

the second symbol is used to receive the energy-saving signal;

a last symbol in the at least one first symbol is adjacent to a $1^{st}$ symbol in the at least one second symbol in time domain; and information transmitted on the first symbol is copy information of information transmitted on the second symbol.

14. The method according to claim 11, wherein each of the $$N_{time}^{1}$$

slots comprises a time domain resource of a physical sidelink feedback channel (PSFCH); and the time domain resource of the PSFCH is used to receive the energy-saving signal.

15. A first terminal apparatus, comprising a transceiver and a processor, wherein the transceiver is configured to cooperate with the processor to obtain identifier information, wherein the identifier information identifies at least one of the following: the first terminal apparatus, a second terminal apparatus, a service of the first terminal apparatus, data of the first terminal apparatus, a service of the second terminal apparatus, or data of the second terminal apparatus;

the transceiver is further configured to cooperate with the processor to obtain resource configuration information, wherein the resource configuration information is used to determine a first resource set of an energy-saving signal, the first resource set comprises at least one of the following: a frequency domain resource set, a time domain resource set, or a code domain resource set, and the energy-saving signal indicates the second terminal apparatus to wake up or indicates the second terminal apparatus to go to sleep, wherein the energy-saving signal is represented by an energy-saving signal sequence generated by using different cyclic shift values $CS_m$ indicating that the energy-saving signal sequence is used to wake up or go to sleep, wherein a wake-up signal (WUS) and a going-to-sleep signal (GTS) are a pair, and each pair of the cyclic shift values indicates the second terminal apparatus to listen to sidelink information from the first terminal apparatus or indicates the second terminal apparatus to go to sleep, wherein $CS_m \geq 2i$, and i is a positive integer and m is an integer greater than or equal to 0;

the processor is configured to determine a first resource based on the identifier information and the first resource set, wherein the first resource belongs to the first resource set; and the transceiver is further configured to cooperate with the processor to send the energy-saving signal to the second terminal apparatus on the first resource.

16. The terminal apparatus according to claim 15, wherein the frequency domain resource set comprises a first sidelink bandwidth part, and the first sidelink bandwidth part is used to send the energy-saving signal;

the frequency domain resource set comprises a second sidelink bandwidth part, and the second sidelink bandwidth part is used to send the energy-saving signal and the sidelink information;

the frequency domain resource set comprises a first sidelink resource pool, and the first sidelink resource pool is used to send the energy-saving signal; or the frequency domain resource set comprises a second sidelink resource pool, and the second sidelink resource pool is used to send the energy-saving signal and sidelink information.

17. The terminal apparatus according to claim 15, wherein the time domain resource set comprises $$N_{time}^{1}$$

slots, wherein $$N_{time}^{1} \geq 1, N_{time}^{1}$$

is a positive integer, and a value of $$N_{time}^{1}$$

is pre-defined, or is configured by a network apparatus, or is pre-configured.

18. The terminal apparatus according to claim 17, wherein each of the $$N_{time}^{1}$$

slots comprises $$N_{time}^{2}$$

symbols, wherein $$N_{time}^{2} \geq 2, N_{time}^{2}$$

is a positive integer, and a value of $$N_{time}^{2}$$

is pre-defined, or is configured by the network apparatus, or is pre-configured.

19. The terminal apparatus according to claim 18, wherein the $$N_{time}^{2}$$

symbols comprise one or more first time units, and each first time unit comprises at least one first symbol and at least one second symbol;

the first symbol is used by the second terminal apparatus to perform automatic gain control (AGC) training;

the second symbol is used to send the energy-saving signal; and a last symbol in the at least one first symbol is adjacent to a $1^{st}$ symbol in the at least one second symbol in time domain.

20. The terminal apparatus according to claim 17, wherein each of the $$N_{time}^{1}$$

slots comprises a time domain resource of a physical sidelink feedback channel (PSFCH); and the time domain resource of the PSFCH is used to send the energy-saving signal.

* * * * *